(12) United States Patent
Hirohata et al.

(10) Patent No.: US 11,656,587 B2
(45) Date of Patent: May 23, 2023

(54) CONTROL APPARATUS, CONTROL METHOD, AND COMPUTER PROGRAM PRODUCT

(71) Applicant: KABUSHIKI KAISHA TOSHIBA, Tokyo (JP)

(72) Inventors: Kenji Hirohata, Koto (JP); Junichiro Ooga, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 120 days.

(21) Appl. No.: 17/412,727

(22) Filed: Aug. 26, 2021

(65) Prior Publication Data
US 2022/0299956 A1    Sep. 22, 2022

(30) Foreign Application Priority Data
Mar. 16, 2021 (JP) ............... JP2021-042834

(51) Int. Cl.
*G05B 17/02* (2006.01)

(52) U.S. Cl.
CPC .................... *G05B 17/02* (2013.01)

(58) Field of Classification Search
CPC .................................................. G05B 17/02
See application file for complete search history.

(56) References Cited

U.S. PATENT DOCUMENTS

| | | | |
|---|---|---|---|
| 7,653,510 B2 | 1/2010 | Hirohata et al. | |
| 2021/0363961 A1* | 11/2021 | Hall | F03D 7/02 |
| 2022/0083713 A1 | 3/2022 | Kano et al. | |

FOREIGN PATENT DOCUMENTS

| | | | |
|---|---|---|---|
| JP | 4439533 B2 | 3/2010 | |
| JP | 2016110396 A | * 6/2016 | |
| JP | 2022-49067 A | 3/2022 | |

OTHER PUBLICATIONS

Greydanus et al., "Hamiltonian Neural Networks", in arXiv: 1906.01563v1 [cs.NE] Jun. 4, 2019, 15 pages.
Cranmer et al., "Lagrangian Neural Networks", in arXiv:2003.04630v2 [cs.LG], Jul. 30, 2020, 9 pages.

* cited by examiner

*Primary Examiner* — Chad G Erdman
(74) *Attorney, Agent, or Firm* — Oblon, McClelland, Maier & Neustadt, L.L.P.

(57) ABSTRACT

A control apparatus according to an embodiment includes one or more hardware processors. The processors acquire, for each of elements, pieces of input data representing first physical field of a corresponding one of the elements at a first time point. The elements are obtained by discretization of an object to be controlled. The processors calculate, for each element, second physical field of a corresponding element at a second time point after the first time point. The second physical field is calculated based on a value of an energy functional representing energy of the corresponding element. The value of the energy functional is obtained by inputting the pieces of input data into an estimation model. The processors control the object such that control quantity based on the second physical field becomes a target value.

17 Claims, 21 Drawing Sheets

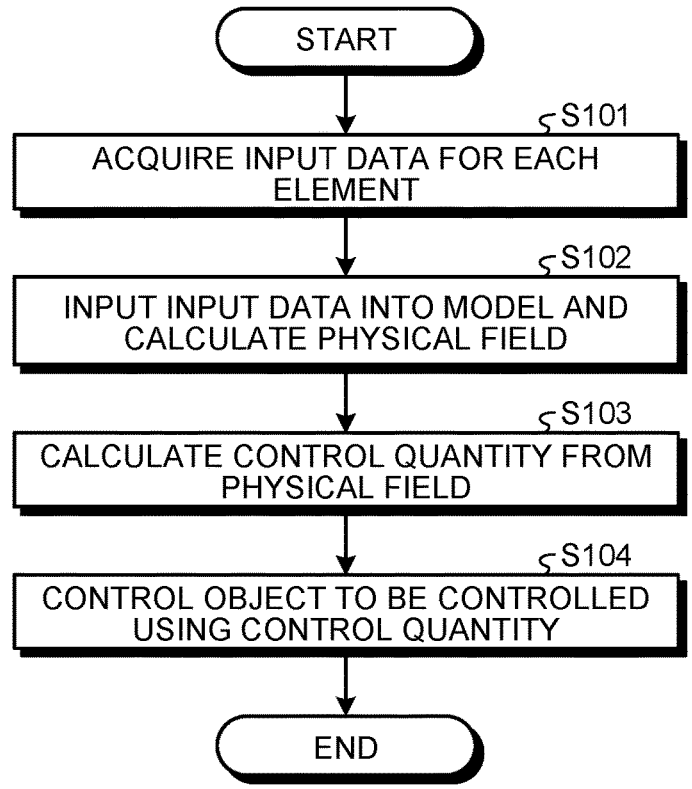
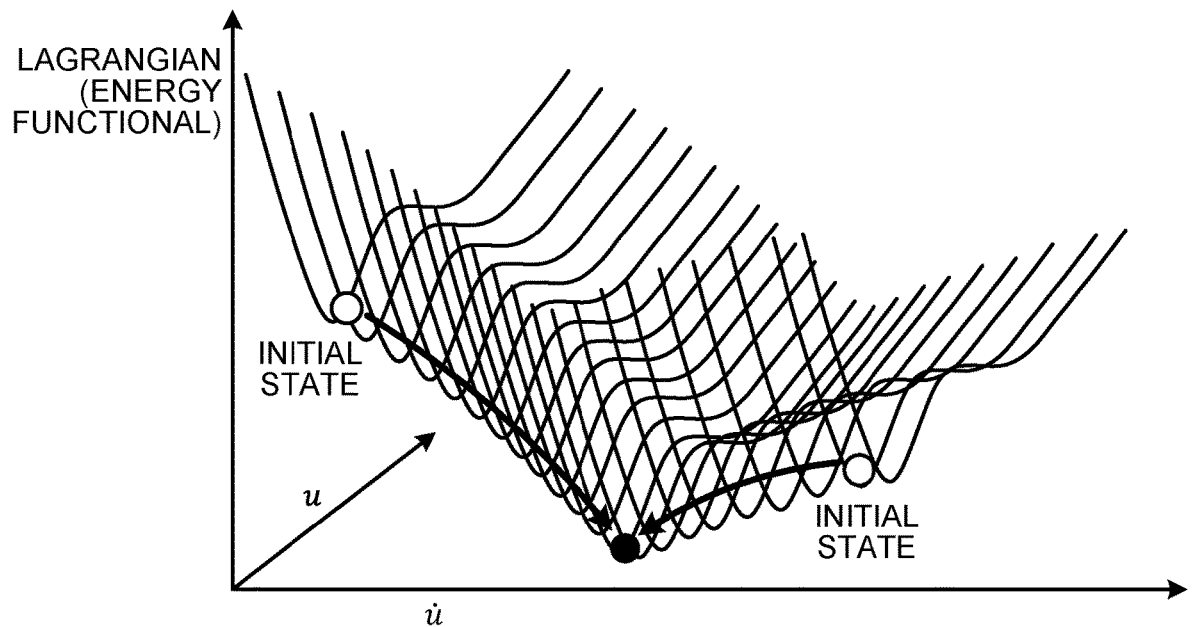

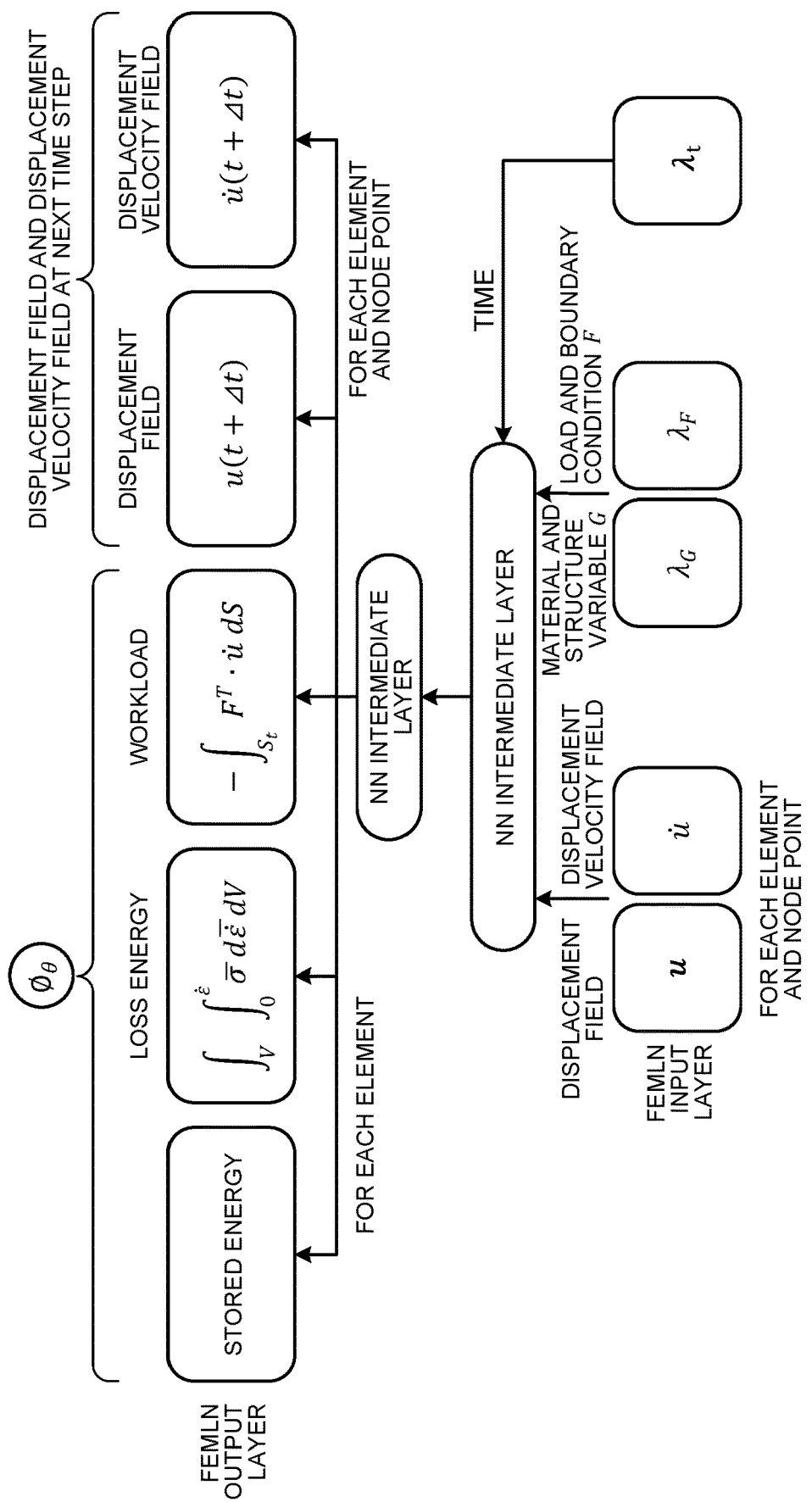

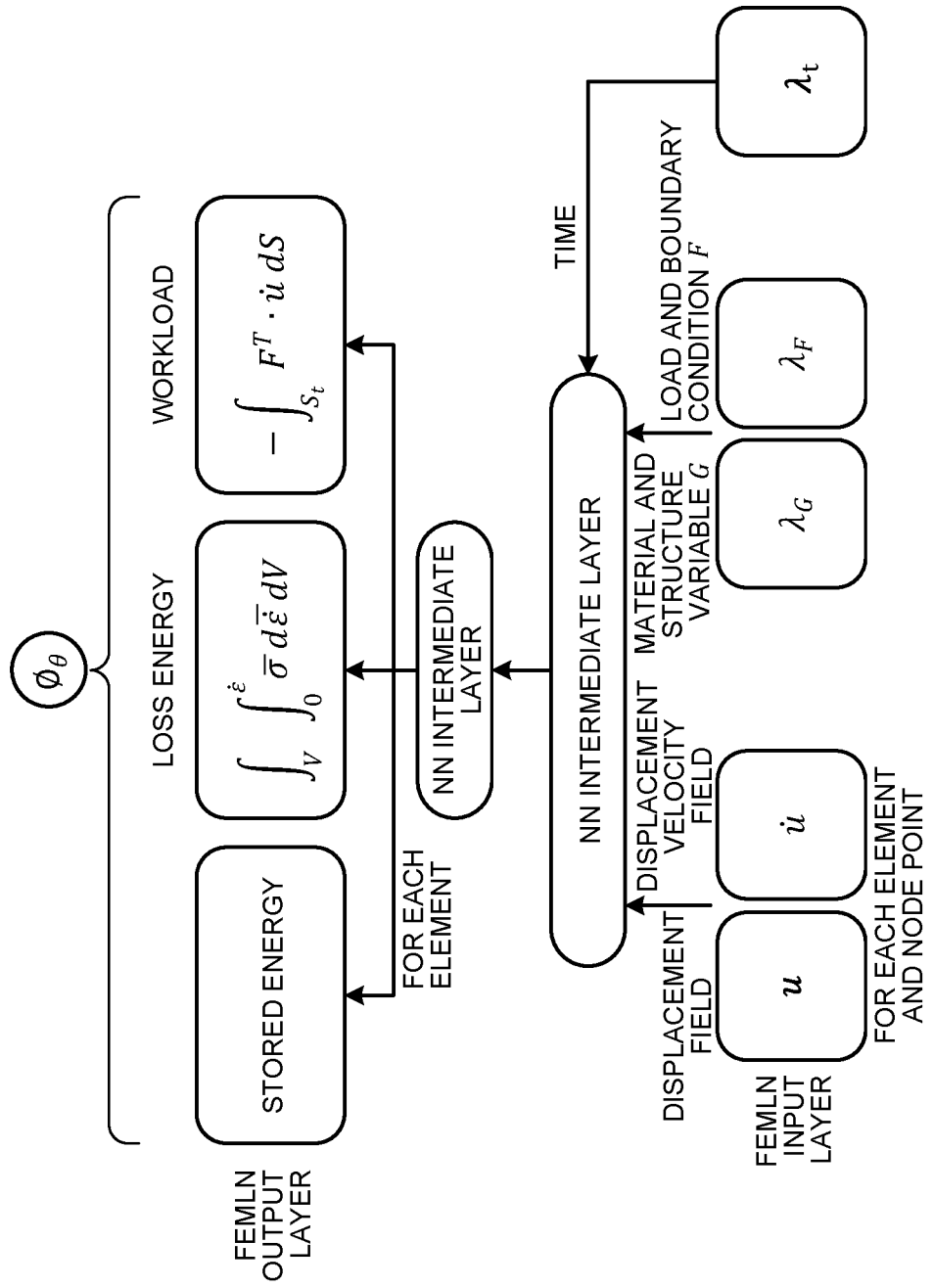

FIG.21
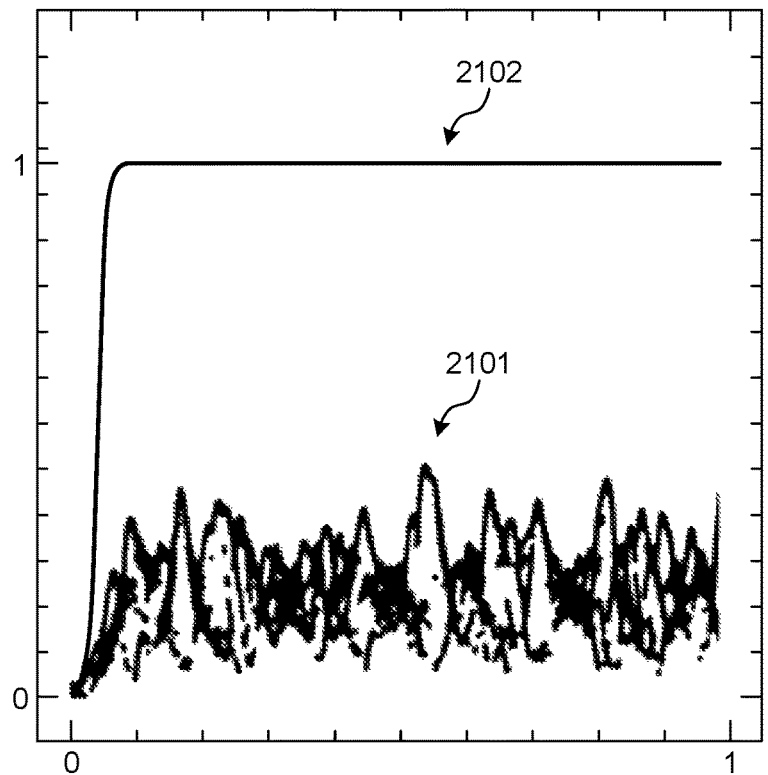
FIG.22
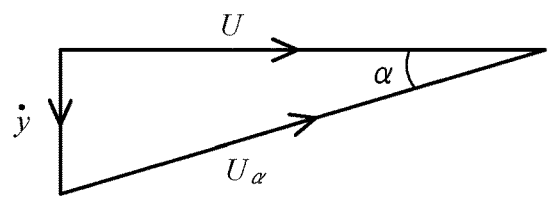
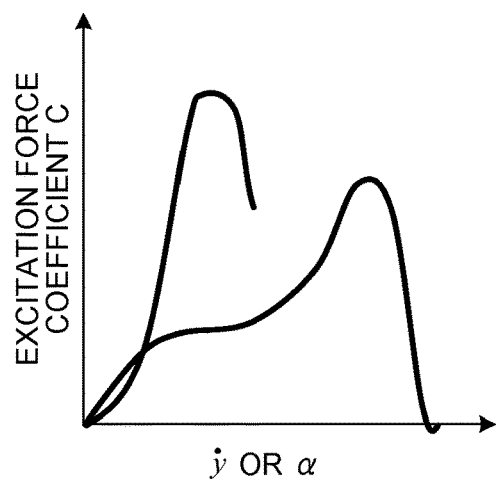

CONTROL APPARATUS, CONTROL METHOD, AND COMPUTER PROGRAM PRODUCT

CROSS-REFERENCE TO RELATED APPLICATIONS

This application is based upon and claims the benefit of priority from Japanese Patent Application No. 2021-042834, filed on Mar. 16, 2021; the entire contents of which are incorporated herein by reference.

FIELD

Embodiments described herein relate generally to a control apparatus, a control method, and a computer program product.

BACKGROUND

There has been known a technique of performing system control using monitoring data such as sensing data and operational data with respect to, for example, control apparatuses for energy systems of wind power generation, tidal power generation, and ocean current power generation, and control apparatuses for infrastructure systems or for flow channel-sorting-reaction control systems in micro plants for precision medicine. In addition, there has been known a technique of estimating physical field related to the control of these systems through a physical phenomenon simulation and a simulation based on a non-linear mathematical model.

However, in the physical phenomenon simulation requiring calculated loads such as a fluid simulation and a fluid-structure interaction simulation and the simulation based on the non-linear mathematical model in the conventional technique, it may take many hours (for example, several hours or more) to estimate physical field. In this case, it is difficult to perform system control in real time using monitoring data.

BRIEF DESCRIPTION OF THE DRAWINGS

FIG. 3 is a flowchart of control processing in the embodiment;
FIG. 4 is a diagram for explaining a concept of analysis using finite element model-based Lagrangian networks (FEMLN);
FIG. 5 is a diagram illustrating a structure example of the FEMLN;
FIG. 6 is a diagram illustrating a structure example of the FEMLN;
FIG. 21 is a diagram illustrating an example of inducing a pulling phenomenon;
FIG. 22 is a diagram illustrating an example of a change in excitation force coefficient.

DETAILED DESCRIPTION

A control apparatus according to an embodiment includes one or more hardware processors. The processors acquire, for each of elements, pieces of input data representing first physical field of a corresponding one of the elements at a first time point. The elements are obtained by discretization of an object to be controlled. The processors calculate, for each element, second physical field of a corresponding element at a second time point after the first time point. The second physical field is calculated based on a value of an energy functional representing energy of the corresponding element. The value of the energy functional is obtained by inputting the pieces of input data into an estimation model. The processors control the object such that control quantity based on the second physical field becomes a target value.

A preferable embodiment of a control apparatus according to the present disclosure will now be described in detail with reference to the accompanying drawings.

The present embodiment describes an example of a method for estimating physical field (such as a displacement field and a displacement velocity field) related to control of a system to be targeted (target system) from sensing data (data on which measuring, sensing, or monitoring is performed) when digital twin is performed in cyber physical systems and utilizing the physical field for control. The following mainly describes an example of defining a displacement field and a displacement velocity field as the physical field. The physical field is not limited to the displacement field and the displacement velocity field, and may be the other physical field and physical velocity field (for example, a pressure field and a pressure change velocity field or a strain field and a strain velocity field).

Specifically, by introducing a discretization numerical calculation method of a partial differential equation and the Lagrangian neural networks serving as a machine learning method, conversion from sensing data required for system control to temporally and spatially physical field distribution can be speeded up and performed with high accuracy.

Examples of the discretization numerical calculation method include a finite element method (FEM), a finite volume method, and a difference method. The following mainly describes an example of using a Lagrangian neural network model utilizing the FEM (hereinafter referred to as finite element model-based Lagrangian networks: FEMLN).

Figure 1:
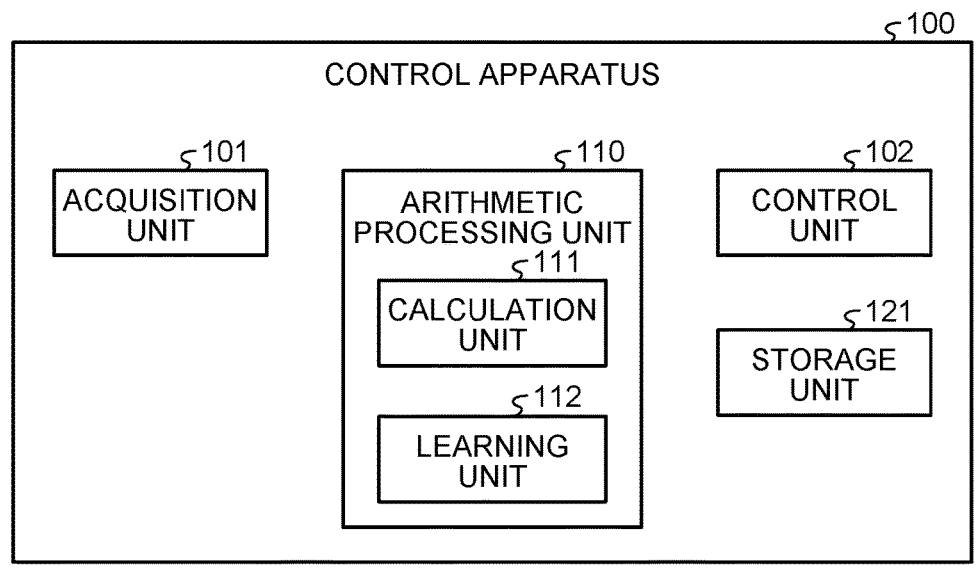
FIG. 1 is a block diagram illustrating a control apparatus according to an embodiment.

FIG. 1 is a block diagram illustrating an example of the configuration of a control apparatus 100 according to the present embodiment. As illustrated in FIG. 1, the control apparatus 100 includes an acquisition unit 101, an arithmetic processing unit 110, a control unit 102, and a storage unit 121.

The acquisition unit 101 acquires various kinds of data to be used in the control apparatus 100. A method for acquiring data may be any method. For example, a method for acquiring data by receiving the data from an external apparatus connected over a network, or a method for acquiring data by reading out the data from a storage medium, is applicable.

The acquisition unit 101 acquires, for example, pieces of input data to be input into the FEMLN, and learning data used for learning the FEMLN. Each of the pieces of input data represents, for example, physical field "Pha" (an example of the first physical field) of a corresponding one of elements that are obtained by performing discretization on an analysis area to be targeted by system control (an example of the object to be controlled) at a time point "ta" (an example of the first time point).

Figure 2:
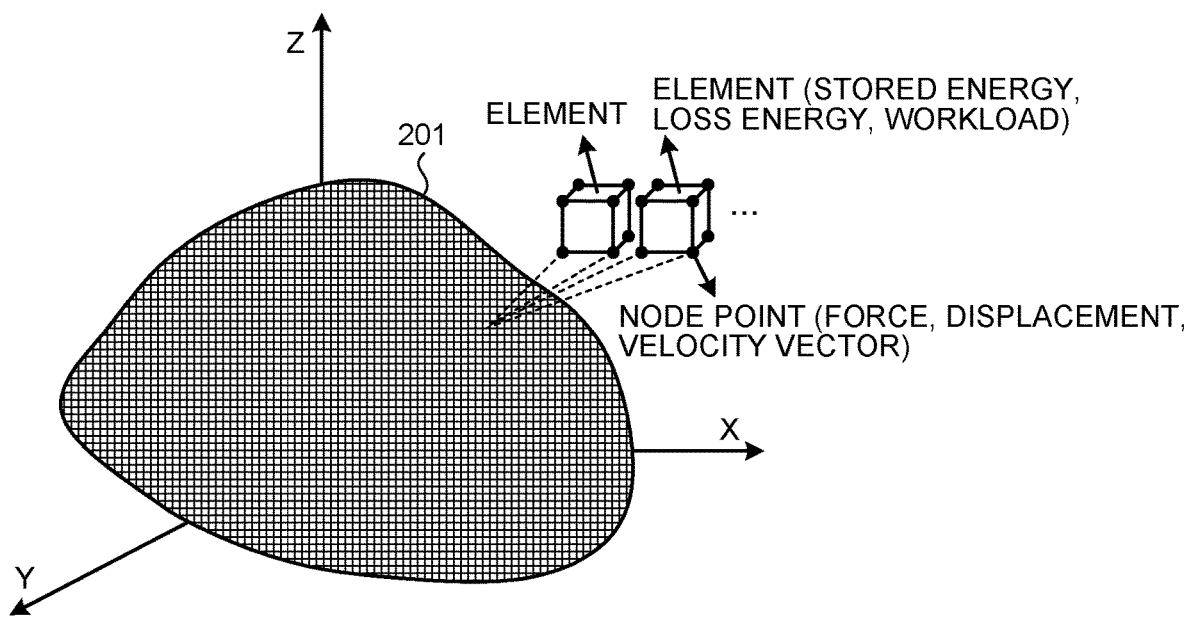
FIG. 2 is a diagram illustrating an example of elements included in an analysis area.

FIG. 2 is a diagram illustrating an example of elements included in an analysis area. Each element corresponds to information obtained by performing spatial discretization on an analysis area 201 surrounded by a curved surface. A node point is a point on a multidimensional space (three-dimensional space in FIG. 2) defining each element.

Hereinafter, a spatial displacement of each node point in the analysis area 201 is denoted by "u". A differential of u corresponds to displacement velocity (velocity vector). Hereinafter, adding a dot on a variable represents a differential of the variable. For example, the displacement velocity is represented by a sign of u on which a dot is added.

In the present embodiment, an energy functional is calculated for each element. The energy functional is represented by, for example, stored energy, loss energy, and a workload, as shown in Expression (1) below.

$$\theta = \text{Elastic energy} + \int_t \int_0^{\varepsilon} \overline{\sigma} d\overline{\varepsilon} dV - \int_{S_f} F^T \cdot \dot{u} dS \quad (1)$$

In Expression (1), "σ" denotes an equivalent stress, "ε" denotes an equivalent strain, "F" denotes an external force vector acting on a boundary, "V" denotes a volume of an object, and "S" denotes a surface area. The second term of Expression (1) corresponds to the integral of equivalent stress and an increment of equivalent strain rate. The third term of Expression (1) corresponds to work done by an object to an external force (product of an external force vector and velocity).

Referring back to FIG. 1, the acquisition unit 101 may further acquire, as input data, sensing data used for system control.

Sensing data corresponds to data indicating, for example, flow velocity of a medium surrounding an object, a direction of a flow, pressure, a load, temperature, acceleration, a displacement, current, voltage, oscillation, and strain. A sensor detecting these pieces of sensing data and an image acquiring apparatus capable of converting the sensing data into physical field are disposed at, for example, a predetermined number of sample points of a structure to be analyzed or a surrounding structure.

Sensing data may indicate performance characteristics of a structure to be analyzed. For example, when an object to be analyzed is a wind power generation plant, performance characteristics may include the following.

Power generator performance
Inverter performance
Rotation frequency
Battery performance
Power generator load rate
Inverter load rate
Power transmission characteristics
Signal transmission characteristics
Noise characteristics
Cooling performance
Operation history Performance characteristics can be acquired by, for example, a profiling tool communicating with a basic input/output system (BIOS) and the like or a monitoring tool.

Sensing data corresponds to a load-boundary condition. The acquisition unit 101 may acquire a design variable of a structure to be analyzed as well as the sensing data. The design variable corresponds to information indicating, for example, a boundary condition, material characteristics, and structure variables (such as shape and size of a structure). Hereinafter, the sensing data and the design variable are referred to as condition data.

The arithmetic processing unit 110 performs an arithmetic operation using the FEMLN on input data acquired by the acquisition unit 101, and estimates physical field related to system control. The arithmetic processing unit 110 includes a calculation unit 111 and a learning unit 112.

The calculation unit 111 calculates, from pieces of acquired input data, physical field that can be used for system control. For example, the calculation unit 111 inputs pieces of input data into an estimation model, and calculates pieces of output data output by the estimation model. Each of the pieces of output data indicates an estimated value of an energy functional representing energy of a corresponding one of the elements that are obtained by performing discretization on an analysis area. The estimation model can be formed as a statistical model, a probability model, and a machine learning model. The estimation model is not limited to neural network models such as the FEMLN, and may be a hierarchical Bayesian model and the like.

The calculation unit 111 further calculates physical field "Phb" (an example of the second physical field) of a corresponding one of elements at a time point "tb" (an example of the second time point) after the time point ta (first time point). The time point tb is, for example, a time point corresponding to a next time step of the time point ta. When a time step is defined as Δt, the time point tb can be represented by "tb=ta+Δt".

The learning unit 112 learns an estimation model used by the arithmetic processing unit 110. The learning unit 112 uses learning data acquired by the acquisition unit 101 to learn the FEMLN. For example, the learning unit 112 learns an estimation model to minimize a difference between a gradient of output data and a gradient of correct answer data.

The control unit 102 controls an object to be controlled. For example, the control unit 102 controls an object to be controlled such that control quantity based on the physical field Phb calculated by the calculation unit 111 becomes a target value. The details of control processing performed by the control unit 102 will be described later.

The units described above (the acquisition unit 101, the arithmetic processing unit 110, and the control unit 102) are implemented by, for example, one or more hardware processors. For example, each of the units may be implemented by causing the hardware processor, such as a central processing unit (CPU), to execute a computer program, in other words, implemented by software. Alternatively, each of the units may be implemented by a processing device such as a dedicated integrated circuit (IC), in other words, implemented by hardware. The units may be implemented by a combination of software and hardware. When two or more processors are used, each processor may implement one of the units, or may implement two or more of the units.

The storage unit 121 stores various kinds of data used for various kinds of processing performed by the control apparatus 100. For example, the storage unit 121 stores input data acquired by the acquisition unit 101, an arithmetic operation result by the arithmetic processing unit 110, and the like.

The storage unit 121 can be formed of any storage media that are commonly used such as a flash memory, a memory card, a random access memory (RAM), a hard disk drive (HDD), and an optical disk.

The following describes control processing performed by the control apparatus 100 according to the present embodiment formed in this manner. FIG. 3 is a flowchart illustrating an example of control processing in the present embodiment.

The acquisition unit 101 acquires pieces of input data (physical field Pha at the time point ta) of one of elements that are obtained by discretization of an analysis area (step S101). The calculation unit 111 inputs the input data into an estimation model and calculates the physical field Phb at the time point tb (step S102). The control unit 102 calculates control quantity for controlling an object to be controlled from the physical field Phb (step S103). The control unit 102 controls the object to be controlled by using the calculated control quantity (step S104), and ends the control processing.

The following describes details of the FEMLN. FIG. 4 is a diagram for explaining a concept of analysis using the FEMLN. From an analogy with the variation principle, in the case of continuum dynamics simulation (inelastic stress simulation and the like), an energy functional being output data of the FEMLN is represented by stored energy, loss energy, and a workload for each of discretized elements. A displacement field and a displacement velocity field (a strain field and a strain rate field) of the inelastic stress simulation are determined as a route (dynamically admissible velocity field) for minimizing the total sum of these energy functionals by the variation principle. Arrows depicted in FIG. 4 indicate an example of routes from initial states. The routes are determined to minimize the total sum of energy functional.

The FEMLN can be formed as below.

(S1) Definition of FEMLN:

A displacement field and a displacement velocity field that are temporally and spatially discretized are defined as input data to a model. In this case, condition data may be added as the input data. An energy functional of each element in a target system is defined as output data of the model. In this case, a displacement field and a displacement velocity field at a next time step (a next time point) may be added as output.

A model (conversion model) that converts input data into output data, or a model (estimation model) that estimates output data from input data, is defined. In the case of a neural network, examples of parameters defining a model include the number of layers, the number of components in each layer, and a structure of an activating function in each component. In the case of a hierarchical Bayesian model, examples of parameters defining a model include a latent variable of an intermediate layer, data distribution, preliminary distribution, and a structure of a hyper-parameter.

(S2) Preparation for Learning Data of FEMLN:

A partial differential equation describing a target system is discretized, and an analysis condition related to condition data is defined. For input data for learning, a displacement field, a displacement velocity field, an energy functional, and a gradient of the energy functional are numerically calculated at every time step for each discretized element and node point. A result of the numerical calculation is prepared as correct answer data for calculating a loss function in the FEMLN. In this case, a numerical value analysis result of performing a parameter survey on condition data may be defined as correct answer data. Learning data including input data and correct answer data is used in learning processing.

(S3) Learning of FEMLN:

An energy functional approximation model (parameter $\theta$) is created by the FEMLN.

A scalar value $\phi_\theta$ of an energy functional, and a displacement field and a displacement velocity field at a next time step are output to input data included in learning data by the FEMLN. The sign $\phi_\theta$ represents a value of an energy functional output by the FEMLN defined by the parameter $\theta$.

Gradients represented by the following Expressions (2) and (3) are calculated by using the FEMLN.

$$\frac{\partial \phi_\theta}{\partial u} \qquad (2)$$

$$\frac{\partial \phi_\theta}{\partial \dot{u}} \qquad (3)$$

A temporal differentiation of a displacement field and a displacement velocity field at a next time step is calculated using the FEMLN.

Parameters of the FEMLN are learned to minimize a loss function using an energy functional, a gradient of a displacement field, and a gradient of a displacement velocity field.

The following describes a structure example of the FEMLN. FIG. 5 is a diagram illustrating a structure example N1 of the FEMLN. The structure example N1 is an example of the structure where both an energy functional (stored energy, loss energy, and a workload) and a displacement field and a displacement velocity field at a next time step are included in output data. FIG. 6 is a diagram illustrating a structure example N2 of the FEMLN. The structure example N2 is an example of the structure where only an energy functional is included in output data.

In the case that output data includes only an energy functional, a displacement field and a displacement velocity field at a next time step are calculated by performing the estimation with the variation principle from the energy functional in the output of the FEMLN.

The sign $\lambda_G$ indicates condition data with respect to material characteristics and a structure variable. The sign $\lambda_F$ indicates condition data with respect to a load condition and a boundary condition. The sign $\lambda_t$ represents condition data related to the time. A part of these pieces of condition data may be input.

As illustrated in FIG. 5, the FEMLN in the structure example N1 includes an input layer, two intermediate layers, and an output layer. The number of the intermediate layers is not limited to two, and may be one or three or more.

The input layer receives, as input data, a displacement field, a displacement velocity field, and condition data $\lambda$, for each element and for each node point. The output layer outputs, as output data, an energy functional for each element, and a displacement field and a displacement velocity field at a next time step for each element and for each node point.

The following describes a loss function used for learning the FEMLN. The loss function is defined, for example, as below.

A function capable of minimizing a difference between a gradient calculated from the FEMLN and a gradient of correct answer data that is a preliminary FEM analysis result (calculated for each discretized element and discretized node point).

Figure 7:
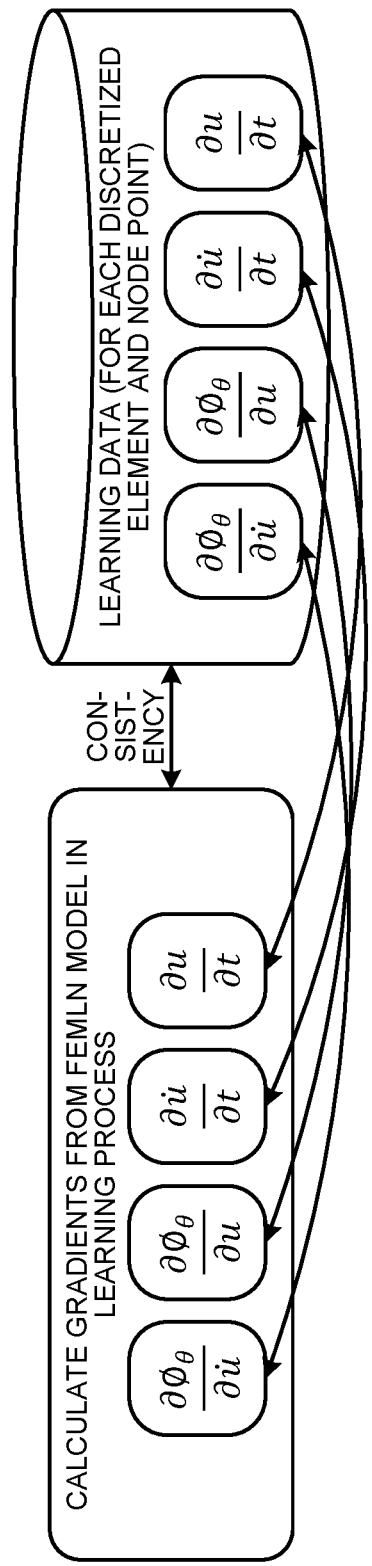
FIG. 7 is a diagram for explaining a difference in each gradient used in a loss function.

FIG. 7 is a diagram for explaining a difference in each gradient used in a loss function. As illustrated in FIG. 7, gradients include a partial differential about a displacement field of a scalar value $\phi_\theta$ of an energy functional, a partial differential about a displacement velocity field of the scalar value $\phi_\theta$ of the energy functional, a partial differential about a time of the displacement velocity field, and a partial differential about a time of the displacement field. For each of these gradients, a difference between a value of a gradient (gradient value) calculated from the FEMLN and a gradient value of correct answer data is calculated.

A loss function corresponds to, for example, the total sum of the square sum of a difference between gradient values of each element or each node point in an analysis area. A gradient value of correct answer data corresponds to, for example, aggregated data of a gradient value calculated for each discretized element or discretized node point. A gradient value of the correct answer data may be calculated using the following relational models.

Relational models such as an approximation model related to an energy functional in which a displacement field is defined as a variable Relational models such as an approximation model related to a displacement field in which a time is defined as a variable A limitation related to an energy functional may be added to a loss function. For example, it may be a loss function based on a limitation condition that a workload done by a target system is equal to the sum of stored energy and loss energy.

Moreover, a loss function may include a function capable of minimizing a difference between an energy functional value calculated from the FEMLN and an energy functional value acquired from a preliminary FEM analysis result about an energy functional.

For the structure (the structure example N1) where output data of the FEMLN includes physical field such as a displacement and displacement velocity, a function capable of minimizing a difference between a value calculated from the FEMLN and a value acquired from a preliminary FEM analysis result about physical field such as a displacement and displacement velocity may be added as a loss function. A weight coefficient of each term in the sum of each of these loss functions may be changed.

A chain rule of a partial differential related to condition data $\lambda$ represented by the following Expressions (4) and (5) may be applied to a gradient related to a displacement field or a displacement velocity field of an energy functional in a loss function.

$$\frac{\partial \phi_\theta}{\partial \lambda} \frac{\partial \lambda}{\partial u} \quad (4)$$

$$\frac{\partial \phi_\theta}{\partial \lambda} \frac{\partial \lambda}{\partial \dot{u}} \quad (5)$$

Partial differential data related to condition data $\lambda$ of an energy functional and partial differential data related to a displacement field and a displacement velocity field of the condition data $\lambda$ are preliminarily prepared as learning data (correct answer data). In learning of the FEMLN, partial differential data related to condition data $\lambda$ of an energy functional (the following Expression (6)), partial differential data related to a displacement field of the condition data $\lambda$ (the following Expression (7)), and partial differential data related to a displacement velocity field of the condition data $\lambda$ (the following Expression (8)) are also calculated.

$$\frac{\partial \phi_\theta}{\partial \lambda} \quad (6)$$

$$\frac{\partial \lambda}{\partial \dot{u}} \quad (7)$$

$$\frac{\partial \lambda}{\partial u} \quad (8)$$

A loss function may include, about partial differential data related to condition data $\lambda$ of an energy functional and partial differential data related to a displacement field and a displacement velocity field of the condition data $\lambda$, a gradient estimated from the FEMLN and a loss function related to the consistency of preliminary learning data.

Figure 8:
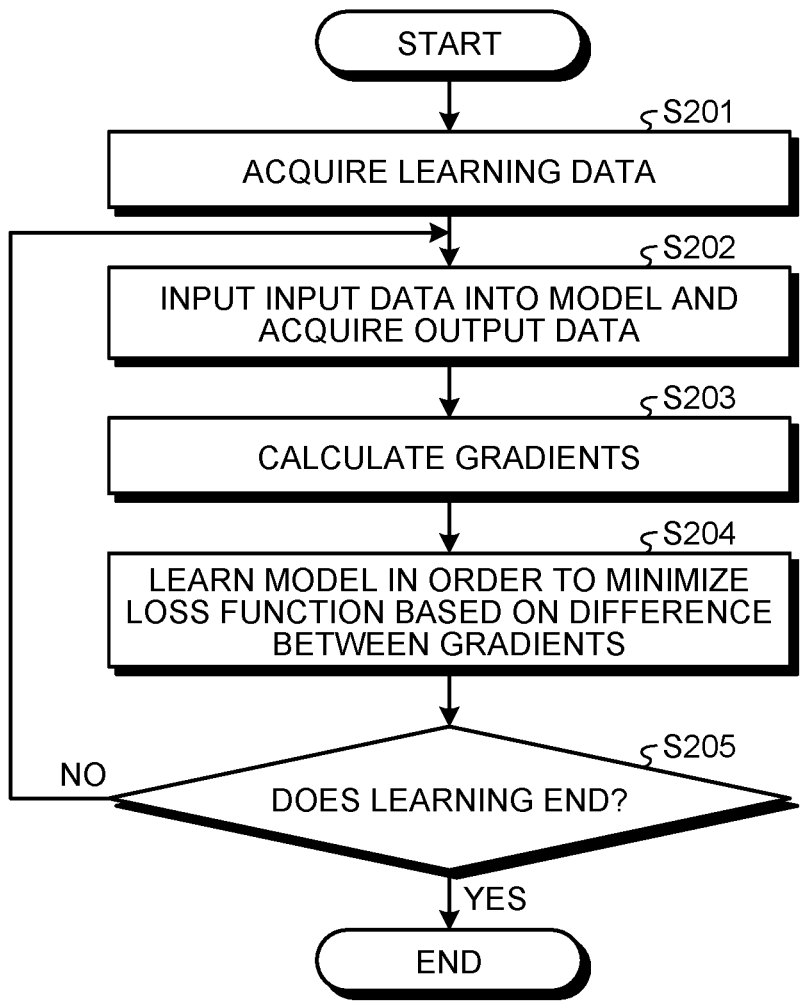
FIG. 8 is a flowchart of learning processing in the embodiment.

The following describes a flow of learning processing of the FEMLN performed by the control apparatus 100 according to the present embodiment. FIG. 8 is a flowchart illustrating an example of learning processing in the present embodiment.

The acquisition unit 101 acquires learning data used for learning (step S201). For example, the acquisition unit 101 acquires learning data prepared in the procedures described above ((S2) Preparation for Learning Data of FEMLN).

The calculation unit 111 inputs, to the FEMLN, input data included in the acquired learning data, and obtains output data output by the FEMLN (step S202). The output data includes, for example, a value of an energy functional, and a displacement field and a displacement velocity field at a next time step. The calculation unit 111 calculates a gradient for the value of the energy functional, a gradient for the displacement field, and a gradient for the displacement velocity field (step S203).

The learning unit 112 learns the FEMLN to minimize a loss function, based on a difference between the calculated gradient and a gradient of correct answer data included in the learning data (step S204).

The learning unit 112 determines whether the learning ends (step S205). The determination can be performed by checking, for example, whether a difference between gradients becomes smaller than a threshold value, and/or whether the number of times of the learning reaches an upper limit.

When the learning does not end (No at step S205), the process goes back to the processing at step S202 and the processing is repeated on new learning data. When the learning is determined to end (Yes at step S205), learning processing ends.

As described above, in the present embodiment, an energy functional is integrated into an output layer of a neural network with the idea based on the variation principle utilizing Lagrangian of an energy functional formed of each element of discretization. The FEMLN is learned to make gradients of a displacement field and a displacement velocity field of Lagrangian consistent with a temporal change in displacement field and displacement velocity field (such as the consistency with a result set of a numerical experiment on which a physical phenomenon simulation is preliminarily performed). With the FEMLN formed in this manner, an ultrafast simulation technique that can be utilized even for a time-dependent physical phenomenon can be implemented. As will be described later, by performing system control using physical field obtained by the FEMLN, real-time system control using monitoring data and the like can be performed.

When performing an ultrafast simulation based on the FEMLN, a limitation that the sum of stored energy and loss energy of output in the FEMLN becomes equal to a workload may be established, and a combination of input data may be preliminarily selected. Alternatively, a combination of input and output data of an ultrafast simulation may be preliminarily selected.

Figure 9:
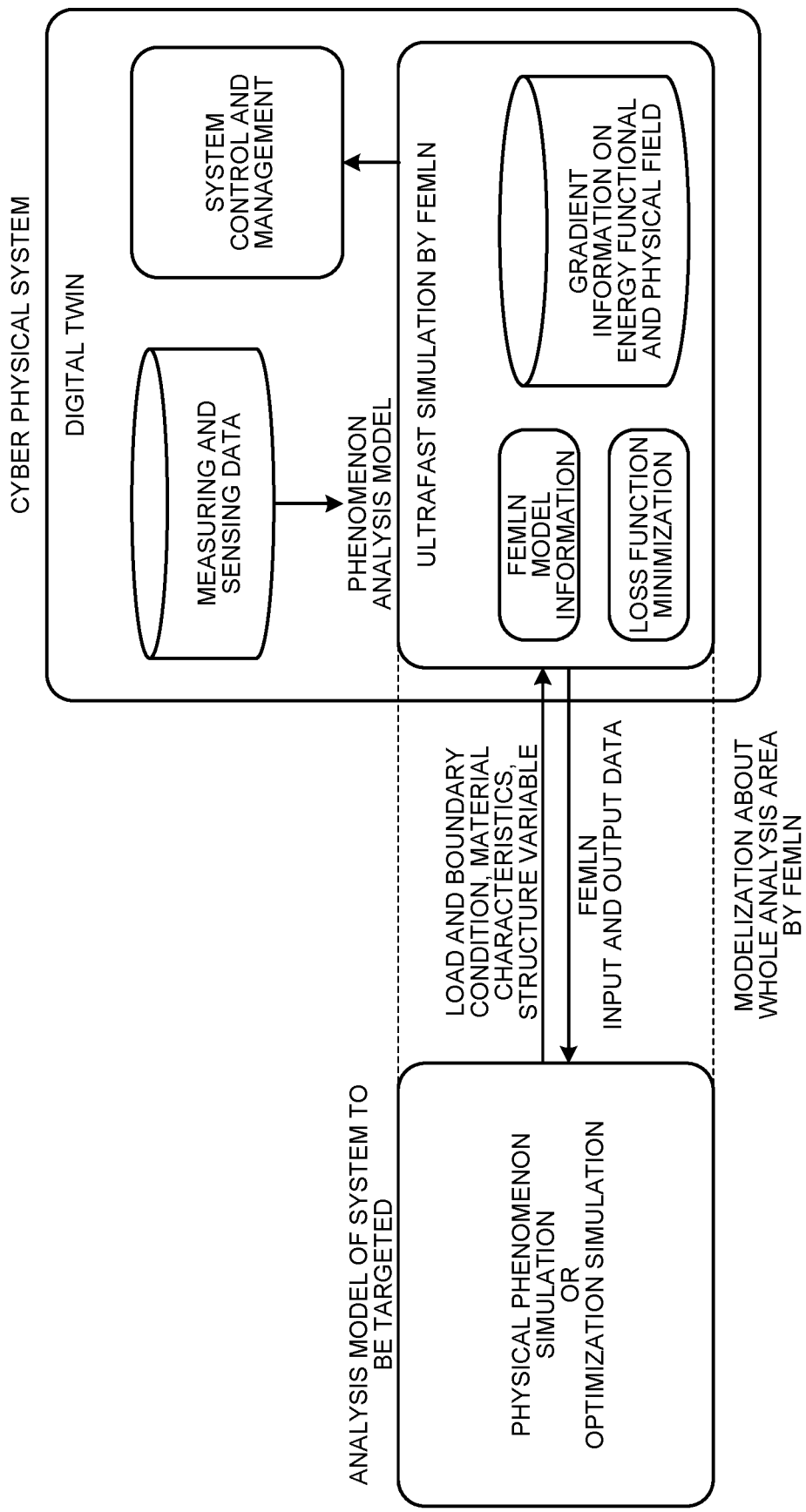
FIG. 9 is a diagram illustrating an application example of the embodiment.
Figure 10:
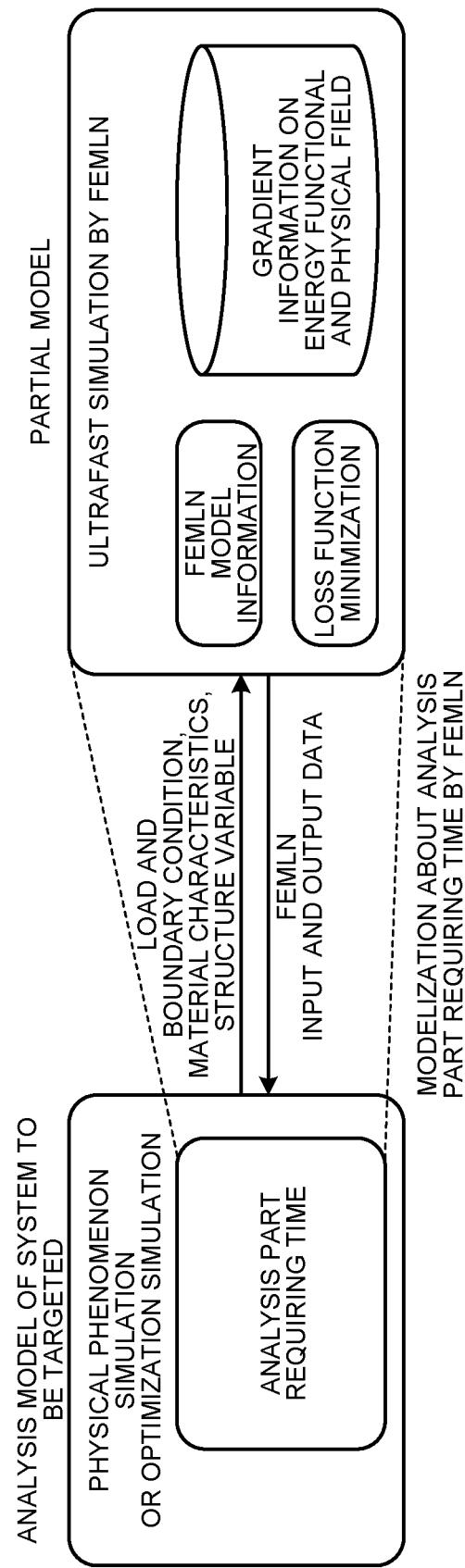
FIG. 10 is a diagram illustrating an application example of the embodiment.

FIGS. 9 and 10 are diagrams illustrating application examples of the present embodiment. FIG. 9 illustrates an example of applying the present embodiment to the whole area to be analyzed. An analysis model of a system to be targeted (target system) is a model for a physical phenomenon simulation or an optimization simulation. As a phenomenon analysis model, an estimation model such as the FEMLN of the present embodiment is applied.

FIG. 10 illustrates an example of applying the present embodiment to, among an area to be analyzed (whole area), only a part of the area taking a lot of time for a simulation such as FEM. As a model applied to a part of the area (partial model), an estimation model such as the FEMLN of the present embodiment is applied. In this case, the control apparatus 100 may include an interface (data acquisition unit) that exchanges condition data (such as a boundary displacement and a load condition) with a simulation of the whole area.

MODIFICATION EXAMPLES

While the example applied to analysis of a continuum dynamics problem has been described, applicable analysis processing is not limited to this example. For example, the technique of the present embodiment can be applied to analysis of the following physical phenomena described with a mathematical model of a partial differential equation.

Electromagnetic field analysis
Coupled analysis of a structure and a magnetic field
Problem of Ginzburg-Landau phenomenon (phase transition phenomenon analysis such as a superconducting phenomenon)
Device simulation (such as electron density and hole density behavior analysis of a semiconductor)

The following describes an energy functional used for each analysis.

(A1) Energy Functional used for Electromagnetic Field Analysis: the following Expression (9)

$$\phi = \int_\Omega \left( \int_t (-W_w + W_j) dt + \int_0^B d\dot{B} \cdot H + \int_0^D d\dot{D} \cdot E \right) dv - \int_{d\Omega} \int_t (S \cdot n) dt ds \quad (9)$$

External work caused by a displacement induced inductive current: $W_w = J \times (u_t \times B)$ [W]
Exothermic energy: $W_j = J^2/\sigma$ [W]
Poynting vector: $S = E \times H$
Magnetic flux density: B [T]
Magnetic field: H [A/m]
Electric flux density: D
Electric field: E [N/C]
Time: t [s]
Volume: $\Omega$ [m$^3$]
Surface area: $d\Omega$ [m$^2$]
Outward unit normal vector: n (A2) Energy Functional used for Coupled Analysis of Structure and Magnetic Field: the following Expression (10)

$$\phi = \int_\Omega \left( E_e + E_k + \int_t (W_c - W_F) dt + E_j + E_{mf} \right) dv - \int_{d\Omega} \int_t (S \cdot n + F \cdot n) dt ds \quad (10)$$

Elastic strain energy: $E_k = \sigma_{ij} \times \varepsilon_{ij}/2$ [J]
Kinetic energy: $E_e = \rho u_{i,t} \times u_{i,t}/2$ [J]
Dissipation energy caused by structural damping: $W_c = \alpha \times \rho u_{i,t} \times u_{i,t} + \beta \times \sigma_{ij,t} \times \varepsilon_{ij}$ [W]
External work caused by an eddy current and the like of a coil: $W_F = F_i \times u_{i,t}$ [W]
Displacement: u [m]
Stress: $\sigma$ [Pa]
Density: $\rho$
Strain: $\varepsilon$
Coefficient of Rayleigh damping: $\alpha$ [s$^{-1}$]
Coefficient of Rayleigh damping: $\beta$ [s]
Force in the i direction: $F_i$ (A3) Ginzburg-Landau Equation: the following Expressions (11) ("i" in Expression (11) represents an imaginary number) and (12)

$$\frac{\partial \psi}{\partial t} = -\left(\frac{i}{\kappa}\nabla + A\right)^2 \psi + \psi - |\psi|^2 \psi \quad (11)$$

$$\sigma \frac{\partial A}{\partial t} = \frac{1}{2i\kappa}(\psi^* \nabla \psi - \psi \nabla \psi^*) - |\psi|^2 A - \nabla \times \nabla \times A \quad (12)$$

Energy functional used in the Ginzburg-Landau equation: the following Expression (13)

$$\phi = \int_\Omega (\mathcal{H}_{sup} + \mathcal{H}_{mag} + \mathcal{H}_{int}) dv \quad (13)$$

Superconductive energy: the following Expression (14)

$$\mathcal{H}sup = \frac{1}{\kappa^2}|\nabla\psi|^2 - |\psi|^2 + \frac{1}{2}|\psi|^4 \quad (14)$$

Energy caused by a magnetic field: the following Expression (15)

$$\mathcal{H}_{mag} = (Ba - \nabla \times A)^2 \quad (15)$$

Interaction energy: the following Expression (16)

$$\mathcal{H}int = \frac{i}{\kappa}A[(\nabla\psi)\psi^* - \psi(\nabla\psi^*)] + |A|^2|\psi|^2 \quad (16)$$

External magnetic field: Ba
Vector potential of a magnetic field: A
Ginzburg-Landau parameter: κ
Order parameter representing a superconductive state: ψ
Electric conductivity of a normal conductive state: σ

(A4) Device Simulation:

Helmholtz free energy F of an energy functional used for crystal defect behavior analysis in a device simulation of a semiconductor is represented as shown in Expression (17).

$$F = \int_\Omega (f_{chem} + f_{ssf} + f_{elast} + f_{grad} + f_{cryst})dx - W \quad (17)$$

Chemical potential: $f_{chem}$
Defect energy: $f_{ssf}$
Elastic strain energy: $f_{elast}$
Gradient energy: $f_{grad}$
Crystallographic energy: $f_{cryst}$
Workload from external stress: W In an area Ω to be targeted with respect to a position vector x, the whole energy functional can be obtained by taking the total sum (integral) of energy functionals f of respective discretized elements.

It takes time to analyze behavior of electron density and hole density distribution in a device simulation of a semiconductor. Thus, it is possible to apply the FEMLN to only behavior analysis of electron density and hole density distribution for chemical potential calculation in crystal defect behavior analysis (example in FIG. 10 described above).

A chemical potential $f_{chem}$ is calculated by the following Expressions (18) and (19).

$$f_{chem} = \mu(\phi) \quad (18)$$

$$\mu = \mu_n + \mu_p \quad (19)$$

Chemical potential function: μ
State quantity for the presence or absence of crystal defect: φ

Chemical potential functions of electron density and hole density can be calculated by the following Expressions (20) and (21).

$$\mu_n = \int_\Omega \int_{E_i}^\infty (E - E_i)D_e(E)F_n(E)dEdx = \int_\Omega n\left(E_c - E_i + \frac{3}{2}k_BT\right)dx \quad (20)$$

$$\mu_p = \int_\Omega \int_{-\infty}^{E_i} (E_i - E)D_h(E)F_p(E)dEdx = \int_\Omega p\left(E_i - E_v + \frac{3}{2}k_BT\right)dx \quad (21)$$

Electron density in the electric field E: $D_e(E)$
Hole density in the electric field E: $D_h(E)$
Fermi-Dirac distribution function of electrons: $F_n(E)$
Fermi-Dirac distribution function of holes: $F_p(E)$ Electron density: n
Hole density: p
Boltzmann constant: $k_B$
Temperature: T
Conduction band: $E_c$
Valence band: $E_v$
Intrinsic semiconductor band: $E_i$ Electron density distribution and hole density distribution can be obtained by self-consistently solving a Boltzmann equation, a Poisson equation, and a current continuity equation.

Figure 11:
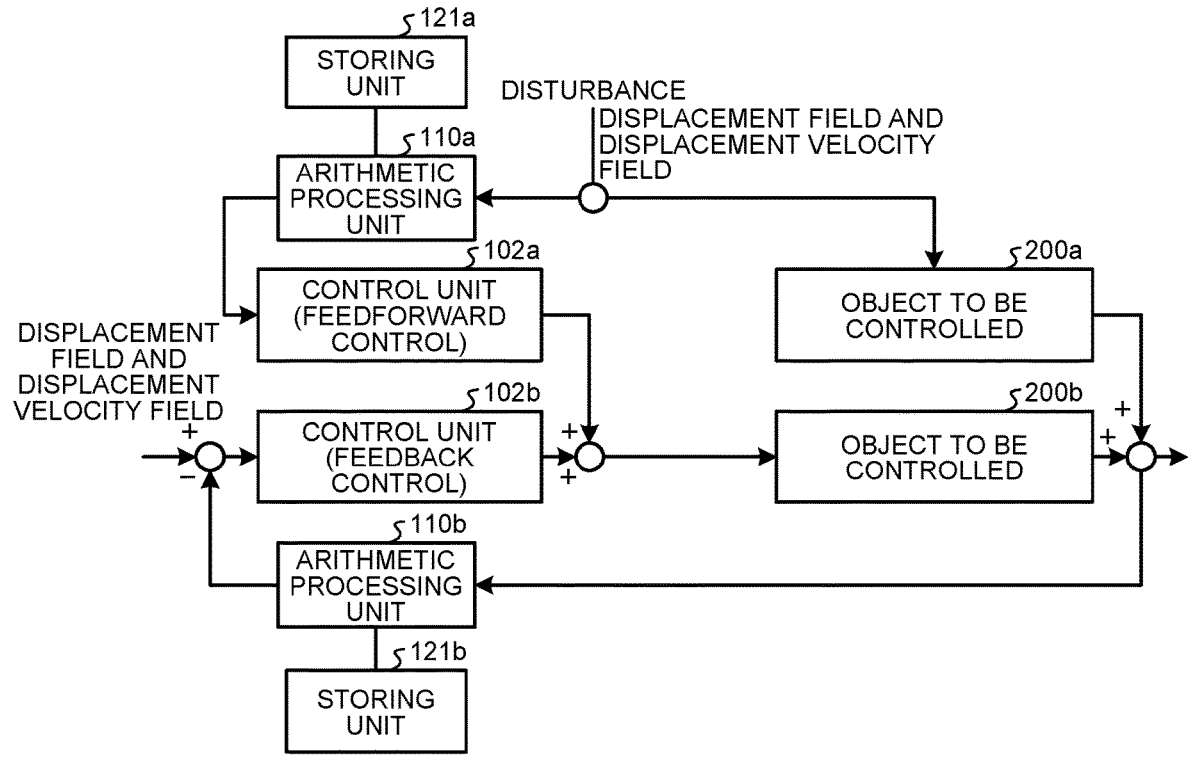
FIG. 11 is a diagram for explaining an example of control processing performed by a control unit.

The following describes details of control processing performed by the control unit 102. FIG. 11 is a diagram for explaining an example of control processing performed by the control unit 102. FIG. 11 illustrates an example of the structure including two control units of a control unit 102a performing feedforward control and a control unit 102b performing feedback control, and the corresponding units (storage units 121a and 121b, and arithmetic processing units 110a and 110b). The control apparatus 100 may only include either the control units 102a or 102b and the corresponding units. The control apparatus 100 may include the three control units 102 or more and their corresponding units.

The arithmetic processing units 110a and 110b each perform an arithmetic operation on data of physical field and the like used for control processing performed by the control units 102a and 102b.

The storage units 121a and 121b each store therein data used for processing performed by the arithmetic processing units 110a and 110b. For example, the storage units 121a and 121b store therein information defining an estimation model (such as the FEMLN) used by each of the arithmetic processing units 110a and 110b, and data (such as input data, an arithmetic processing result, and learning data) used for processing performed by the corresponding estimation model.

An object 200a to be controlled corresponds to, for example, characteristics of response from a disturbance factor to a sensor. An object 200b to be controlled corresponds to, for example, characteristics of response from a control action unit, which causes an object to be targeted to operate, to the sensor.

To an estimation model of the arithmetic processing unit 110a, input data representing a displacement field and a displacement velocity field affected by disturbance is input. The control unit 102a obtains control quantity for feedforward control from the physical field Phb at the time point tb calculated by the arithmetic processing unit 110a, and performs the feedforward control with the obtained control quantity.

The control unit 102b performs feedback control to reduce a difference between a displacement field and a displacement velocity field calculated by the arithmetic processing unit 110b and the measured displacement field and displacement velocity field. In other words, the control unit 102b performs feedback control such that a difference being an example of the control quantity becomes zero being an example of a target value.

An object to be controlled may be any object, whereas the following mainly describes an example of defining, for example, an object used for a power generation system and an object inducing self-excited oscillation or self-excited rotation (an oscillating object or a rotating object) as an object to be controlled. The self-excited rotation can be implemented by a mechanism such as a crank mechanism (which may have a counterweight installed) converting self-excited oscillation into rotation. The following mainly describes an example of applying to an oscillating object that performs self-excited oscillation. When "oscillation" is replaced with "rotation", the same procedures can be also applied to a rotating object that performs self-excited rotation. The oscillating object (rotating object) that performs self-excited oscillation (self-excited rotation) is also referred to as a self-excited oscillator (self-excited rotor).

For example, the control unit 102b controls an oscillating object to perform stable and robust self-excited oscillation (limit cycle). More specifically, the control unit 102b controls an oscillating object defining ideal relation between an excitation force for oscillating the oscillating object and a displacement velocity (or an attack angle α) of the oscillating object itself as a target value. The excitation force may be represented by an excitation force coefficient serving as a dimensionless, normalized, or standardized value. The following mainly describes an example of representing an excitation force with an excitation force coefficient. The control unit 102b may set limitation conditions such as a condition that flow velocity of a medium (hereinafter, a surrounding medium, for example, wind and water) surrounding (for example, windward) an oscillating object exceeds critical flow velocity $U_c$ exciting a stable limit cycle.

Examples of input data of an estimation model (for example, the FEMLN) used for an oscillating object include the following data.

Flow field (which may include other flow fields such as vorticity) of flow velocity (which may be one or more) and the like of a surrounding medium Temperature field and humidity field (which can be utilized for estimating a physical property value related to a flow field of density and the like of a surrounding medium)

Displacement field of pressure distribution and the like (each node point or each element) of a surface of an oscillating object Displacement velocity field of pressure change velocity distribution and the like (each node point or each element) of a surface of an oscillating object Oscillation displacement of an oscillating object itself (for example, a displacement of a barycentric position of an oscillating object)

Oscillation displacement velocity of an oscillating object itself (for example, displacement velocity of a barycentric position of an oscillating object)

Condition data $\lambda_t$ related to a time

Furthermore, the input data may include a variable related to a material model of an oscillating object (for example, a degree of elasticity) and a variable related to a structure model of the oscillating object (for example, sheet thickness) for data assimilation utilizing sensing data or calibration.

For example, a flow field of flow velocity and the like of a surrounding medium described above corresponds to condition data $\lambda_F$ about a load condition and a boundary condition in FIGS. 5 and 6. For example, a variable related to a material model and a variable related to a structure model correspond to condition data $\lambda_G$ about material characteristics and a structure variable in FIGS. 5 and 6.

Physical field of the flow velocity, the displacement, the pressure, and the like may be each component of a vector, and may be a contracted value or a norm. The physical field described above may be a numerical value at a time point t and may be a numerical value taking the average or moving average to a time point (t−nΔt) that is before the time point t.

Under the input of a displacement field, a displacement velocity field, a load-boundary condition, and a material-structure variable at the time point t (time point ta), an estimation model (for example, the FEMLN) estimates, through an energy functional serving as output, a displacement field and a displacement velocity field at the time point (t+Δt) (time point tb) that is a next time step after the time point t. By repeating this processing, a temporal change (time history) in displacement field and displacement velocity field is estimated. In this manner, relation between an excitation force coefficient and displacement velocity of an oscillating object or relation between the excitation force coefficient and a flow field (for example, wind velocity) of a surrounding medium can be estimated.

The control unit 102 controls, in order to make consistent with a target value of the relation, a surface shape of an oscillating object, a direction of the oscillating object, and control quantity (a control variable and a control parameter) of an airflow control mechanism and the like. The target value is preliminarily prepared by, for example, a data table, a relational expression, and a mathematical model.

The measured flow velocity of a surrounding medium, temperature, humidity data, and the like cause physical field related to a flow field of the surrounding medium to be changed. Thus, the control unit 102 may sequentially correct a preliminarily prepared target value in conformity to sensing data.

Figure 12:
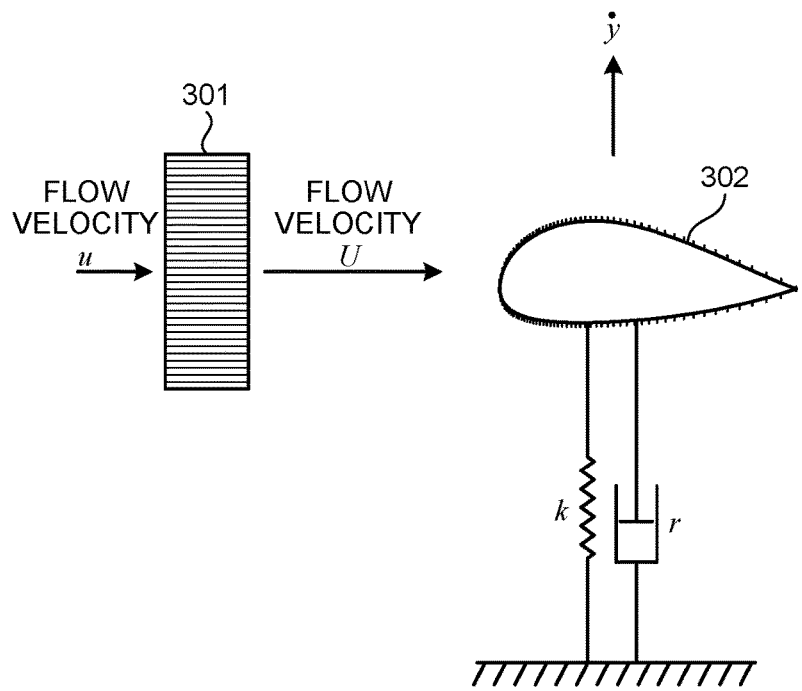
FIG. 12 is a diagram illustrating an example of an oscillating object that performs self-excited oscillation.

FIG. 12 is a diagram illustrating an example of an oscillating object 302 that performs self-excited oscillation. The oscillating object 302 has a blade-like structure (blade structure), and oscillates depending on, for example, gas (airflow) of flow velocity U. In this case, the oscillating object 302 can be used for, for example, wind power generation. The shape of the oscillating object 302 is not limited to a blade type, but a shape capable of reducing resistance of an airflow is desirable. Liquid (water flow) or fluid such as a mixture of gas and liquid (multiphase flow) may be used in place of gas (airflow). In other words, the oscillating object 302 may be used for tidal power generation, ocean current power generation, and the like. The following mainly describes an example of a case where gas is used as fluid.

The oscillating object 302 is represented by a viscosity parameter "r", an elastic parameter "k", and the like. The oscillating object 302 is displaced vertically in FIG. 12 by oscillation. Hereinafter, a coordinate defining a direction of oscillation as a y direction is used. FIG. 12 represents velocity (y dot) when a displacement is defined as y. The control unit 102 defines the oscillating object 302 as an object to be controlled, and controls, in order to induce self-excited oscillation, a shape of a blade of the oscillating object 302, a direction of the blade, the viscosity parameter r, the elastic parameter k, and the like. Control quantity of those is input into the control unit 102 as control input data.

In an example illustrated in FIG. 12, an airflow control mechanism 301 is provided in front of the oscillating object 302. The airflow control mechanism 301 is a mechanism (such as increased velocity and rectification of a flow field) that controls an airflow surrounding the oscillating object 302. In the example of FIG. 12, the airflow control mechanism 301 increases an airflow of flow velocity "u" to an airflow of the flow velocity U (u<U). The airflow control mechanism 301 is not necessarily provided in front of the oscillating object 302, and may be provided in any direction surrounding the oscillating object 302 including the rear of the oscillating object 302.

The airflow control mechanism 301 may have, for example, the structure of a plurality of blades, and allow the shape of the blades and the direction of the blades to be controlled. In other words, the control unit 102 may control the shape and the like of blades of the airflow control mechanism 301 to make the oscillating object 302 to induce oscillation.

Figure 13:
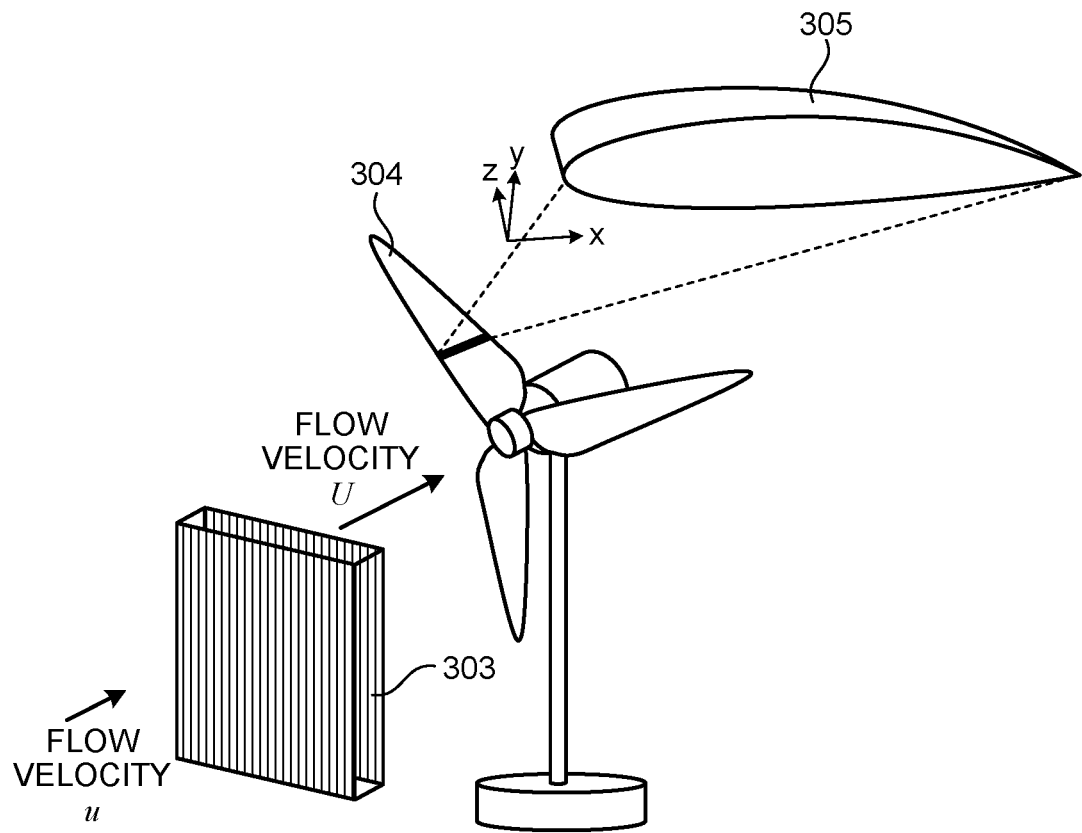
FIG. 13 is a diagram illustrating an example of an oscillating object that performs self-excited oscillation.

FIG. 13 is a diagram illustrating the other example of an oscillating object that performs self-excited oscillation. An oscillating object 304 in FIG. 13 is an example of a rotating propeller blade-like oscillating object. A partial blade 305 corresponds to a part that is cut out of one blade having a rotating propeller blade shape. An airflow control mechanism 303 that controls an airflow surrounding the oscillating object 304 may be provided.

Figure 14:
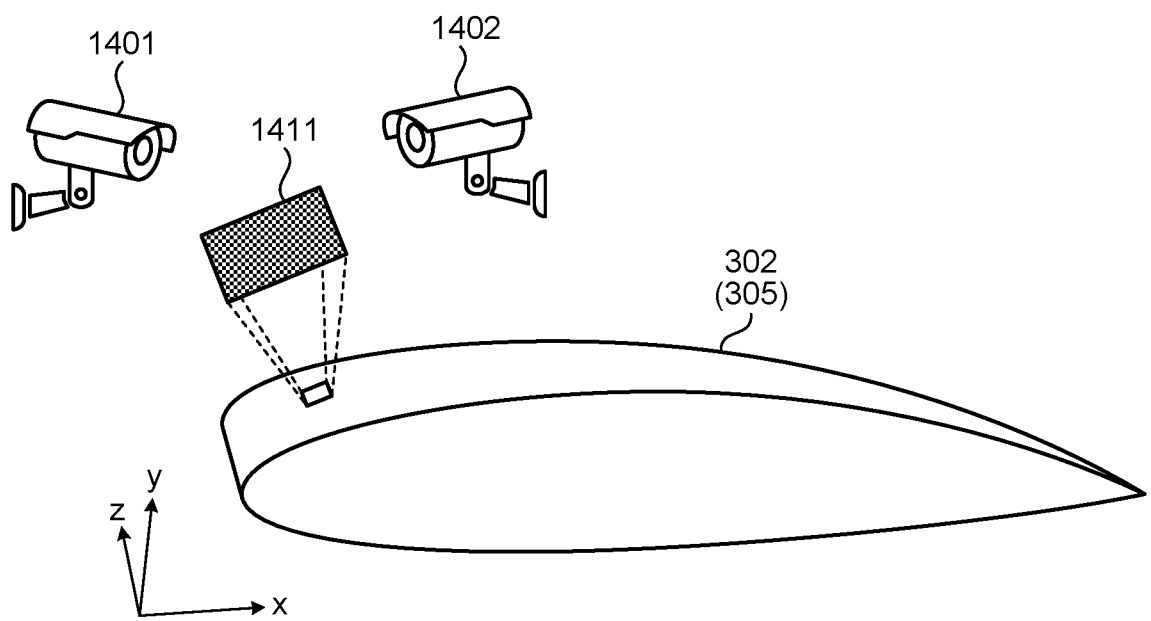
FIG. 14 is a diagram for explaining an example of a method for measuring a displacement of a surface of the oscillating object.

Any method may be used for measuring displacements (displacement distribution) or deformation (deformation distribution) of the oscillating objects 302 and 304. Examples of such a method include a method using images taken by an image-taking apparatus (such as a camera), and a method for measuring displacement-deformation distribution of a surface of the oscillating object 302 through the measurement of displacements of a plurality of springs included in the oscillating object 302. FIG. 14 is a diagram for explaining an example of a method for measuring a displacement of a surface of the oscillating object 302 using images. The same measuring method can be also applied to a displacement of a surface of the partial blade 305.

Cameras 1401 and 1402 each functioning as one of the sensors take images of a surface of the oscillating object 302, and output time-series images. As illustrated in an enlarged part 1411, a pattern identifiable in the taken image is given to the surface of the oscillating object 302. For example, images are acquired by the acquisition unit 101, and are output to the arithmetic processing unit 110. The arithmetic processing unit 110 applies, for example, a digital image correlation method to the acquired images so as to calculate temporal distribution and spatial distribution of displacements, deformation, or strain of the oscillating object 302.

Figure 15:
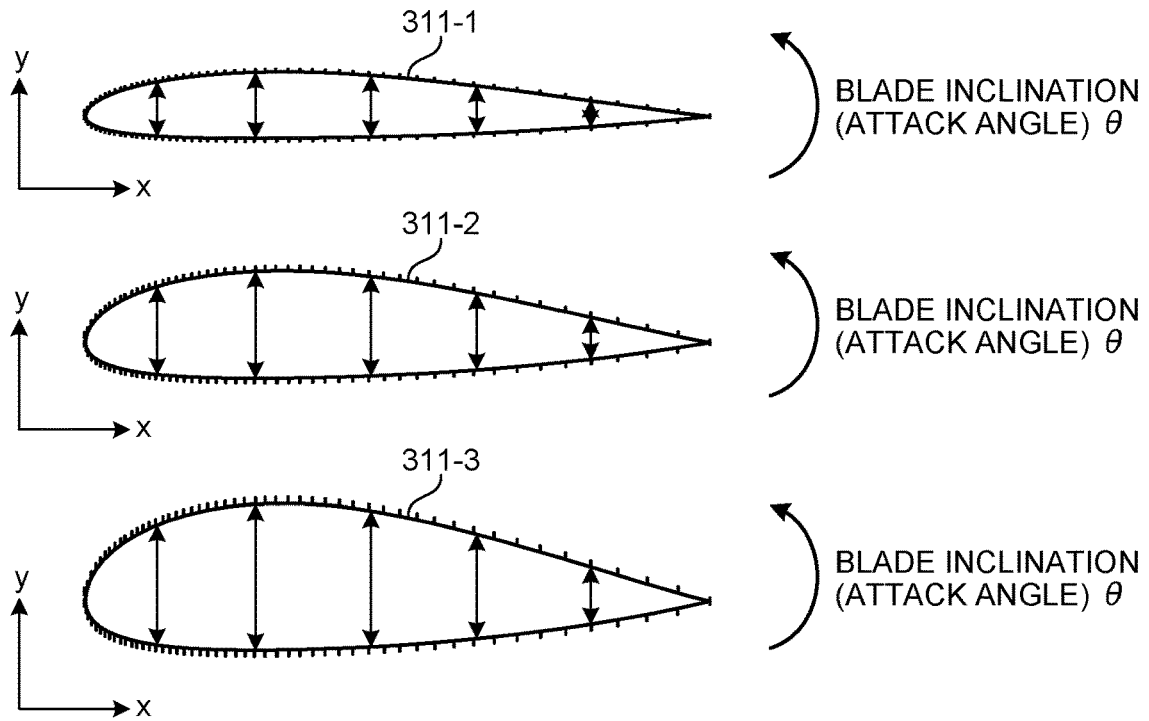
FIG. 15 is a diagram illustrating an example of a method for controlling oscillating objects that have the blade structure.

The following describes an example of a method for controlling oscillating objects (such as the oscillating object 302 and the partial blade 305) having the blade structure. FIG. 15 is a diagram illustrating an example of the control defining National Advisory Committee for Aeronautics (NACA) blade-type oscillating objects 311-1, 311-2, and 311-3 as an object to be controlled. The oscillating objects 311-1, 311-2, and 311-3 correspond to oscillating objects that are controlled by the control unit 102 such that the oscillating objects 311-1, 311-2, and 311-3 have shapes different from each other.

In order to change at least one of the shape of a blade and an inclination of the blade, the control unit 102 controls, for example, the operation of an actuator changing a shape and an actuator changing an inclination. Five arrows in FIG. 15 indicate that the shape of a blade can be controlled with five-degree-of-freedom. The degree-of-freedom is not limited to five, and may be two to four, or, six or more. The control unit 102 may control the shape and the like of blades to be changed so as to satisfy a limitation that the surface of the oscillating objects 311-1, 311-2, and 311-3 is smooth.

Figure 16:
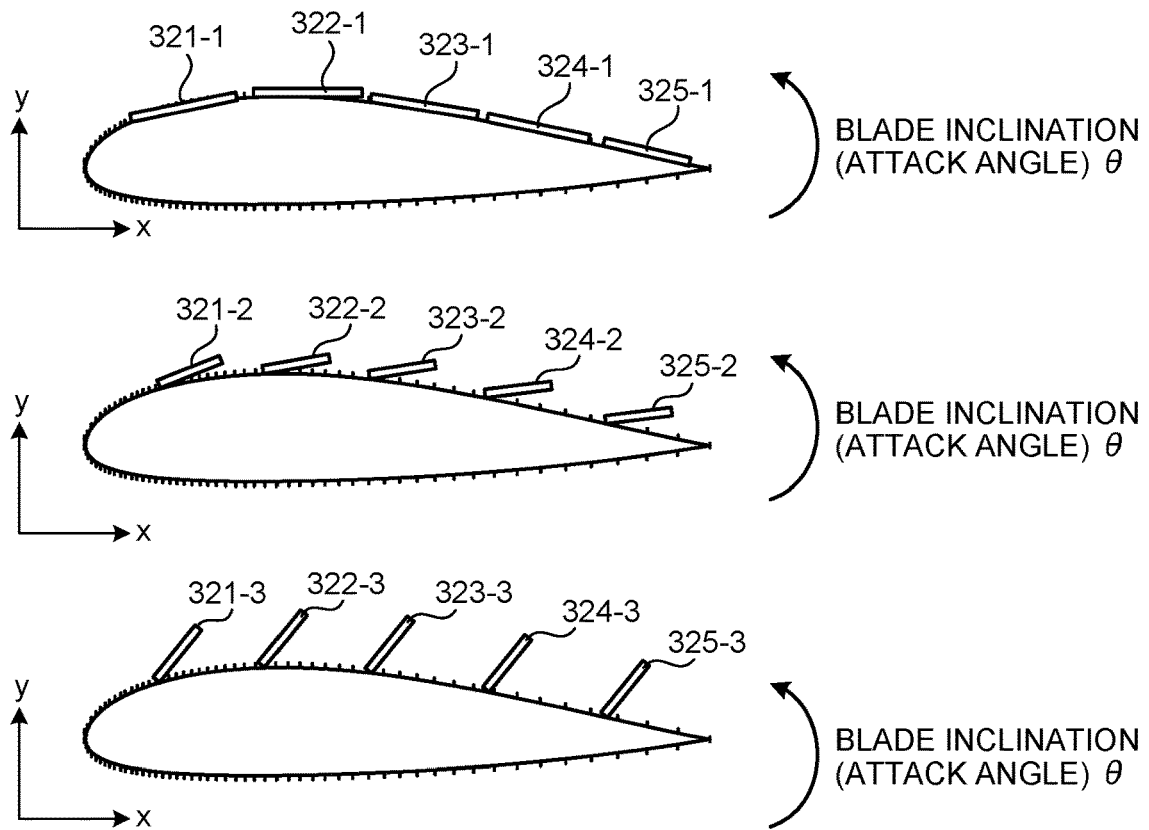
FIG. 16 is a diagram illustrating an example of a method for controlling oscillating objects that have the blade structure.

FIG. 16 is a diagram illustrating the other example of a method for controlling oscillating objects that have the blade structure. FIG. 16 illustrates the example of controlling the shape of blades of the oscillating objects by changing the inclination of a plurality of vanes provided on the surface of the oscillating objects. FIG. 16 illustrates the example in which the oscillating object has five vanes 321-1 to 325-1, but the number of vanes is not limited to five (five-degree-of-freedom). Each of the vanes 321-2 to 325-2 and the vanes 321-3 to 325-3 is an example of a set of vanes having the inclination changed to the inclination different from that of the vanes 321-1 to 325-1.

In order to change at least one of the inclination of a plurality of vanes and the inclination of the whole blade, the control unit 102 controls, for example, the operation of an actuator changing the inclination of the vanes and an actuator changing the inclination of the whole blade.

Figure 17:
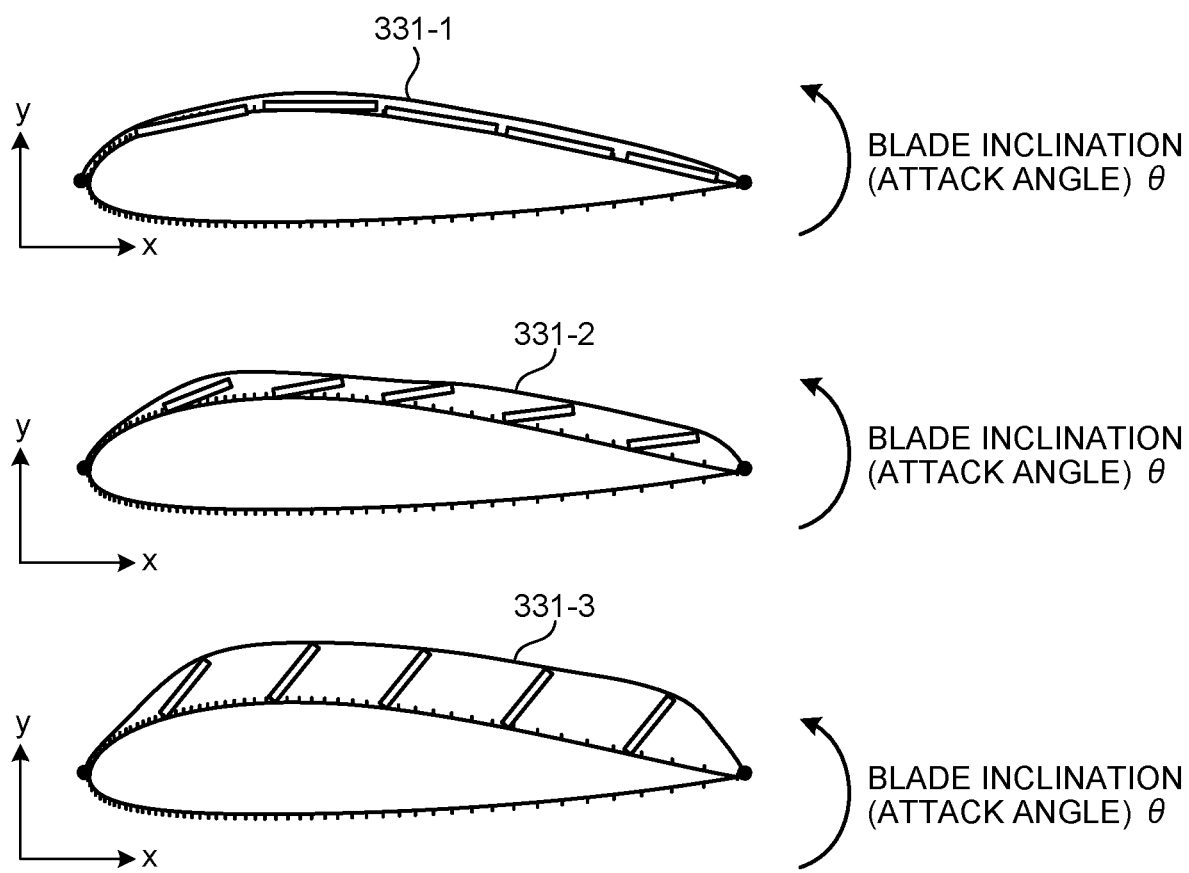
FIG. 17 is a diagram illustrating an example of a method for controlling oscillating objects that have the blade structure.

FIG. 17 is a diagram illustrating the other example of a method for controlling oscillating objects that have the blade structure. FIG. 17 is an example of controlling the oscillating objects that further include elastic materials 331-1 (331-2 and 331-3) covering the upper part of the vanes (321-1 to 325-1 and the like) in FIG. 16.

In this case, the control unit 102 can also change at least one of the inclination of the vanes and the inclination of the whole blade with the same method as in FIG. 16.

The control methods in FIGS. 15 to 17 are examples, and are not intended to limit the control method. For example, the control unit 102 may cause an actuator to generate an induced flow on a surface of a blade-like oscillating object so as to control the oscillating object to induce self-excited oscillation. Examples of the induced flow include a plasma induced flow, an electroosmotic flow, a temperature-density gradient flow, and a jet flow outputting from the inside of an oscillating object through a small hole on the surface of the oscillating object.

The control of one oscillating object has been described, but the control apparatus 100 may control a plurality of oscillating objects. In this case, the control unit 102 may perform control to induce a phase pulling phenomenon by interaction between oscillating objects. The interaction includes interaction of oscillatory propagation from a support base commonly supporting oscillating objects and interaction of each self-excited oscillation by airflows.

In a case that an excitation force generated from a plurality of oscillating objects is converted into rotational movement by, for example, a crank mechanism, a crankshaft may include a balancer by a counterweight. In order to make rotation smooth, each connection unit may be installed by displacing an angle phase as a general cross-plane format. In order to gain a stable and smooth rotation force from oscillating objects, a clutch mechanism may be provided.

Figure 18:
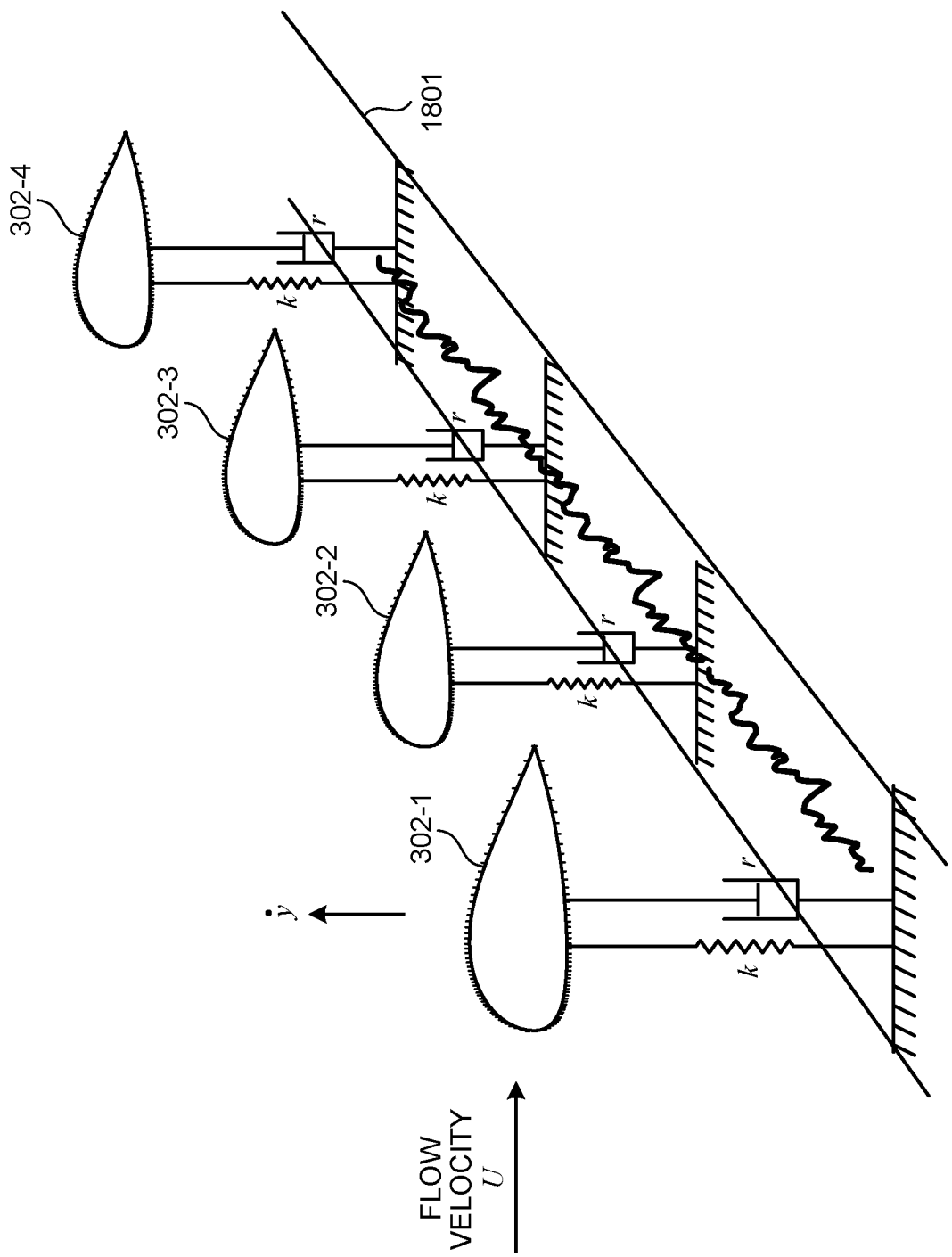
FIG. 18 is a diagram illustrating an example of interaction between oscillating objects.
Figure 19:
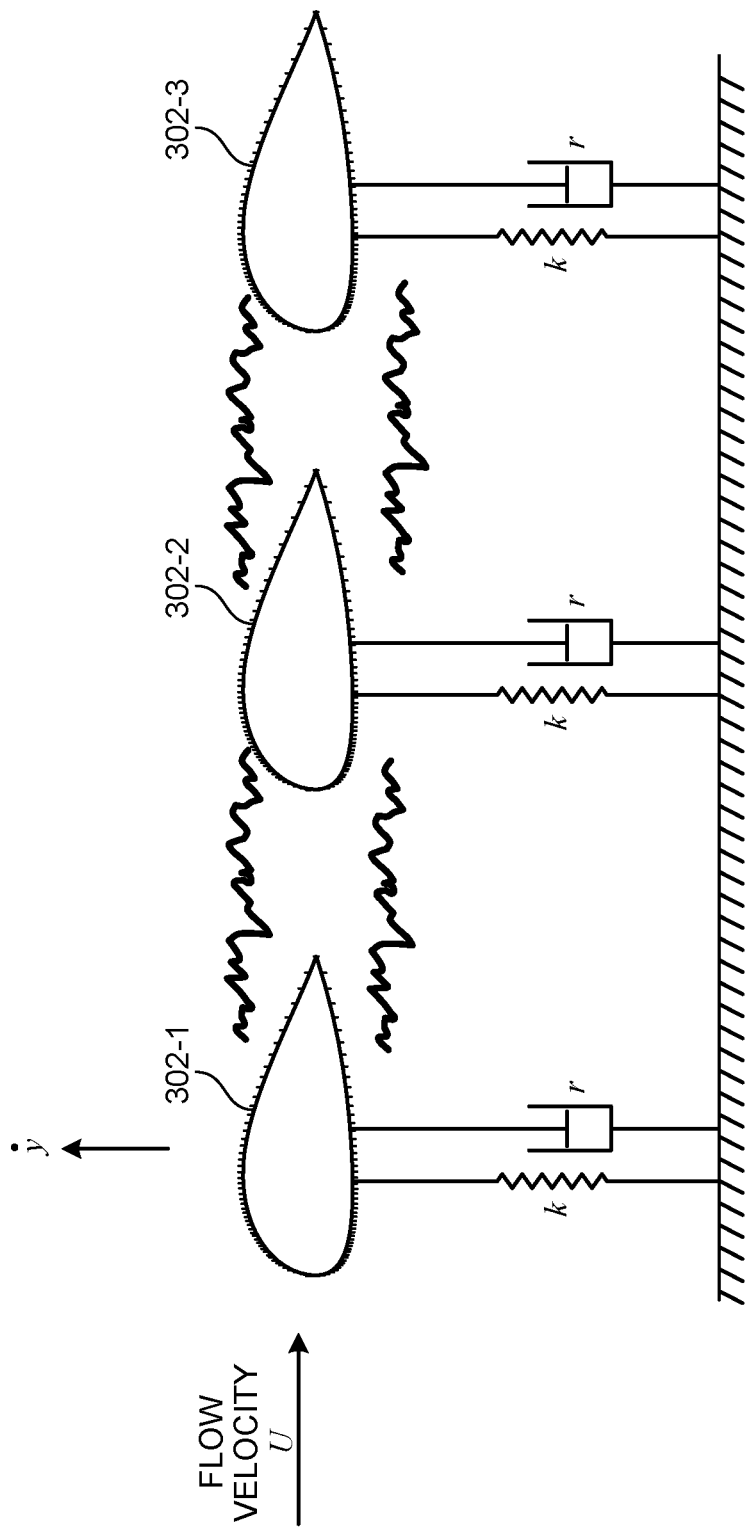
FIG. 19 is a diagram illustrating an example of interaction between the oscillating objects.
Figure 20:
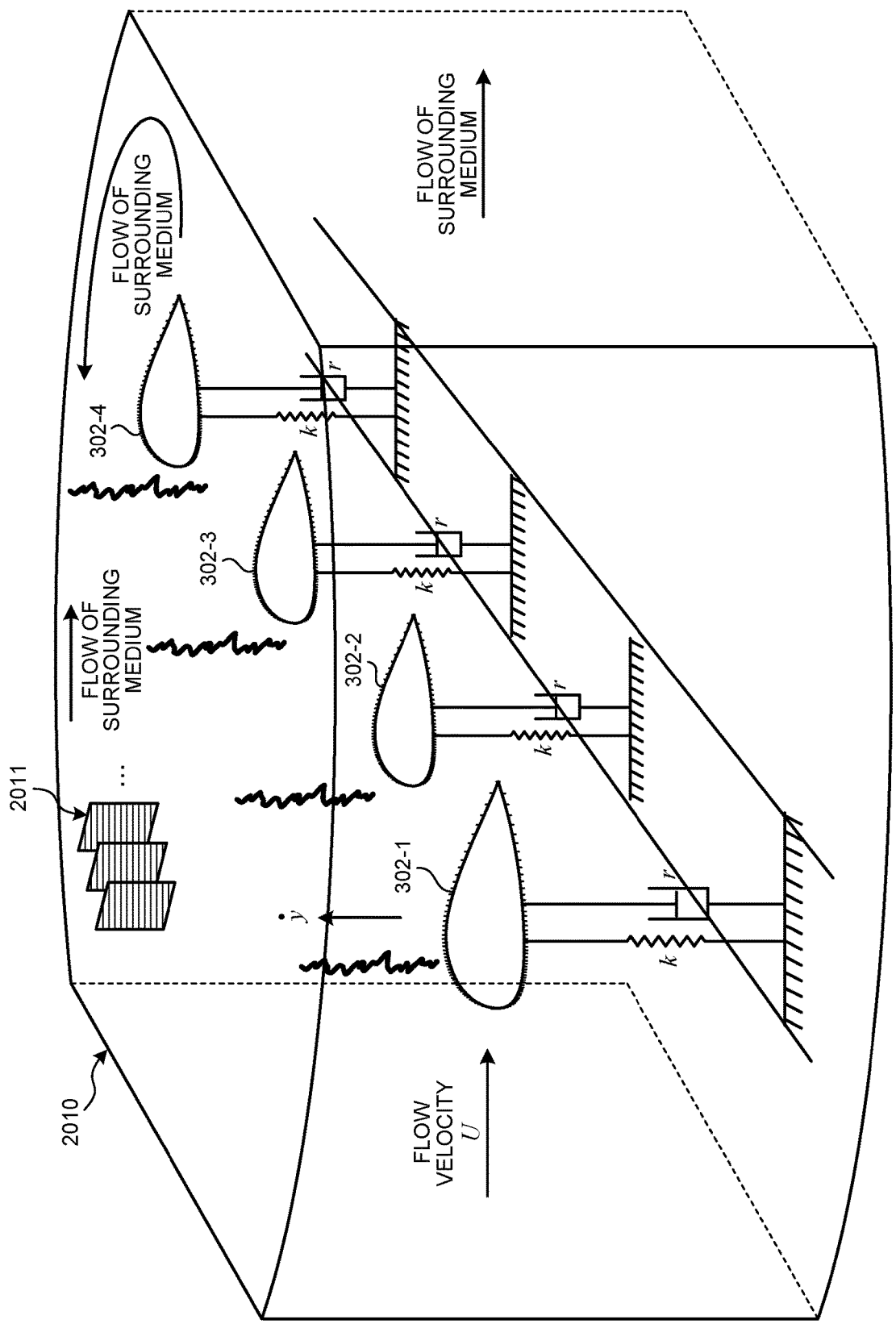
FIG. 20 is a diagram illustrating an example of interaction between the oscillating objects.

FIGS. 18 to 20 are diagrams illustrating examples of interaction between oscillating objects. FIG. 18 illustrates an example in which interaction occurs between oscillating objects 302-1 to 302-4 through oscillatory propagation of a support base 1801. FIG. 19 illustrates an example in which interaction occurs between the oscillating objects 302-1 to 302-3 through a flow field (surrounding airflow).

FIG. 20 illustrates an example that interaction occurs between the oscillating objects 302-1 to 302-4 through an action from a surrounding field. The action from a surrounding field is, for example, an action of a flow field controlled by a control mechanism 2010 that performs increased velocity and rectification of the flow field surrounding the oscillating objects 302-1 to 302-4. The control mechanism 2010 includes, for example, a control mechanism 2011 having a blade-type surface shape for increased velocity and rectification.

In a case that a plurality of oscillating objects is provided, control is performed to induce a phase pulling phenomenon. Thus, a more stable excitation force is generated and robust control can be performed on disturbance. In this case, a target value is defined such that relation between an excitation force coefficient and physical field affecting operation of oscillating objects induces stable and robust self-excited oscillation, and corresponds to relation inducing a pulling phenomenon through interaction between the oscillating objects. FIG. 21 is a diagram illustrating an example of inducing a pulling phenomenon. In FIG. 21, a horizontal axis represents the time, and a vertical axis represents an excitation force coefficient.

A graph 2101 represents a change in excitation force in a case that interaction does not occur between oscillating objects. A graph 2102 represents a change in excitation force in a case that interaction occurs between the oscillating objects. By controlling a variable (interaction coefficient and the like) defining the extent of interaction between oscillating objects to an appropriate value, phases of oscillation of the oscillating objects can be synchronized so as to stably generate a large excitation force. In other words, an inter-pulling phenomenon of structurally stable self-excited oscillation (limit cycle) can be generated.

The following describes a dynamic model of an oscillating object that performs self-excited oscillation by an excitation force (which may be hereinafter referred to as a self-excited oscillating object).

Expression (22) represents an excitation force. The sign C represents an excitation force coefficient, the sign ρ represents density of a surrounding medium (air and the like), the sign a represents an equivalent area of a cross section on the front side of an oscillating object, the sign U represents flow velocity, and the sign a represents an attack angle.

Excitation force=½ρU²aC(α)  (22)

FIG. 22 is a diagram illustrating an example of a graph representing a change in excitation force coefficient C with respect to velocity (y dot) of oscillation or the attack angle α of an oscillating object. The velocity of oscillation and the attack angle α have relation illustrated on the upper part of FIG. 22. The sign $U_\alpha$ corresponds to flow velocity in an attack angle α direction. Hereinafter, explanation is mainly made using relation between velocity of oscillation and an excitation force coefficient, but the same procedures can be applied even when the velocity of oscillation is replaced by the attack angle α. The lower part of FIG. 22 represents a graph with respect to two oscillating objects that have the shape of blades and the direction of the blades different from each other. As illustrated in the graph, for example, depending on the control of the shape of blades and the direction of the blades of oscillating objects, the graph representing a change in excitation force coefficient can be varied.

The relation between an excitation force coefficient and an attack angle is, for example, when approximated by a septic function, represented as shown in Expression (23). The sign m represents mass of an oscillating object.

$$m\ddot{y} + r\dot{y} + ky = \frac{1}{2}\rho U^2 a \left\{ A_1\left(\frac{\dot{y}}{U}\right) - A_3\left(\frac{\dot{y}}{U}\right)^3 + A_5\left(\frac{\dot{y}}{U}\right)^5 - A_7\left(\frac{\dot{y}}{U}\right)^7 \right\} \quad (23)$$

When Expression (23) is truncated up to a cubic function, relation between an excitation force coefficient and an attack angle can reduce to the Van der Pol equation by variable conversion. Expression (24) is an example of an expression representing the relation between an excitation force coefficient and an attack angle with a cubic function.

$$m\ddot{y} + r\dot{y} + ky = \frac{1}{2}\rho U^2 a \left\{ A_1\left(\frac{\dot{y}}{U}\right) - A_3\left(\frac{\dot{y}}{U}\right)^3 \right\} \quad (24)$$

Expression (23) is an expression in which an excitation term (first term of the right side) corresponding to an excitation force includes a linear function and a cubic function related to displacement velocity possibly generating a limit cycle. An excitation term can be taken as a term in which a non-linear term (cubic function) suppresses oscillation (linear function) associated with divergence. The excitation term may further include a function equal to or more than a cubic function, such as a quintic function or a septic function.

When the flow velocity U (for example, wind velocity) of a surrounding medium exceeds the critical flow velocity $U_c$, negative aerodynamic damping is made larger than positive structure damping and a limit cycle is generated at the stable Hopf bifurcation (dynamic bifurcation). When the flow velocity U further increases, a state where there is one unstable limit cycle between two stable limit cycles appears.

Figure 23:
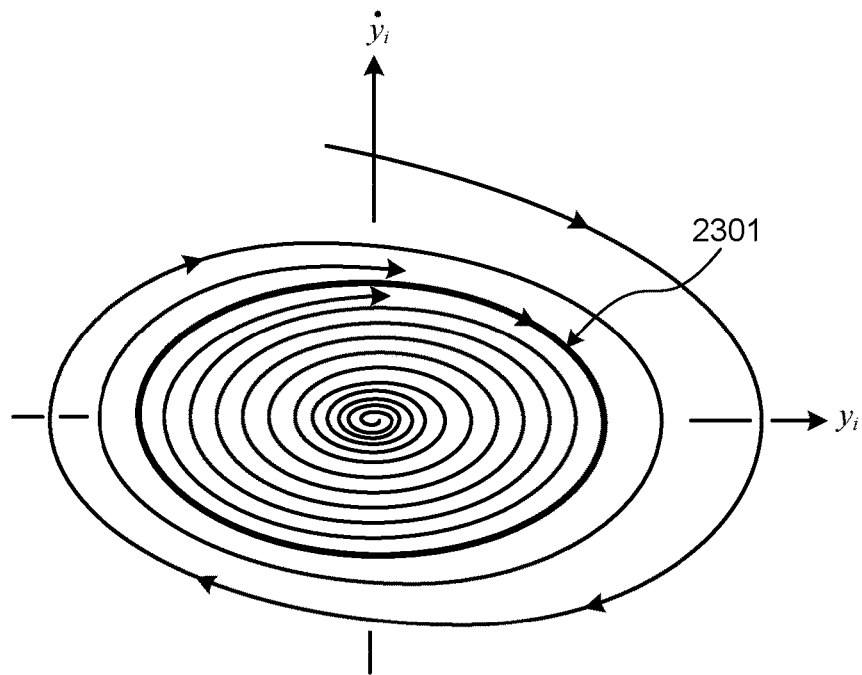
FIG. 23 is a diagram illustrating an example of relation between a displacement and displacement velocity of the oscillating object.

FIG. 23 is a diagram illustrating an example of relation between a displacement (horizontal axis) and displacement velocity (vertical axis) of an oscillating object. A line 2301 in FIG. 23 represents a structurally stable limit cycle independent of an initial state. The control unit 102 controls oscillation of an oscillating object with a goal of a stable limit cycle. A condition for generating a limit cycle is represented by the following Expression (25).

$$U_c \geq \frac{2r}{\rho a A_1} \quad (25)$$

Expressions (26) and (27) indicate examples of dynamic models that include a pulling phenomenon of a plurality of (n: n is an integer equal to or larger than 2) oscillating objects. The sign $y_i$ (1≤i≤n) represents a displacement of the i oscillating object.

$$m\ddot{y}_i + r\dot{y}_i + ky_i = \frac{1}{2}\rho U^2 a\left[ A_1\left(\frac{\dot{y}_i}{U}\right) - A_3\left(\frac{\dot{y}_i}{U}\right)^3 \right] + \epsilon \sum_{j}^{n}(ky_j + r\dot{y}_j) + F(t) \quad (26)$$

$$m\ddot{y}_i + r\dot{y}_i + ky_i = \frac{1}{2}\rho U^2 a\left\{ A_1\left(\frac{\dot{y}_i}{U}\right) - A_3\left(\frac{\dot{y}_i}{U}\right)^3 \right\} + \epsilon_1 k_1 \dot{y}_1 + \epsilon_2 k_2 \dot{y}_2 + \ldots + \epsilon_n k_n \dot{y}_n \quad (27)$$

Expression (26) is an example of representing an interaction term (second term of the right side) by a single interaction coefficient ε. The interaction coefficient ε is, for example, an oscillatory propagation coefficient of a support base supporting an oscillating object. The third term of the right side in Expression (26) represents a fluctuation term corresponding to disturbance. Expression (26) corresponds to a model for the interaction illustrated in FIG. 18.

Expression (27) indicates an example of using interaction coefficients $\epsilon_1$ to $\epsilon_n$ defined for each oscillating object. Expression (27) corresponds to, for example, models of interaction illustrated in FIGS. 19 and 20.

Expressions (26) and (27) can be taken as expressions modeled such that the whole behavior in a plurality of oscillating objects reduces to the Ginzburg-Landau equation.

The arithmetic processing unit 110 (calculation unit 111) inputs flow velocity of surrounding gas, flow quantity, a direction of a flow (which may include temperature and humidity), and the like as condition data, and calculates physical field used for controlling an oscillating object using the FEMLN. Examples of the physical field include a displacement field and a displacement velocity field of an oscillating object.

The following describes an example of the control based on calculation of physical field and the calculated physical field.

Control Example-1

This is an example of a case where sensing cannot be performed on displacement distribution of a surface of an oscillating object by a sensor and the like, for example, a case where a method for measuring displacement distribution using images taken by the image-taking apparatus described above cannot be applied.

The calculation unit 111 calculates, by using an estimation model and the like different from the FEMLN, pressure distribution of a surface of an oscillating object from a displacement field and a displacement velocity field. The FEMLN may calculate pressure distribution of a surface of an oscillating object as physical field.

Moreover, by integrating the calculated pressure distributions over the surface of an oscillating object, the calculation unit 111 calculates a temporal change in excitation force coefficient loaded to the oscillating object and dependence property with respect to displacement velocity of the oscillating object (displacement velocity dependence property).

The control unit 102 controls, for example, in order to improve pressure of the following areas, at least one of the surface shape and the direction of an oscillating object to be changed.
  Area where pressure of a surface of an oscillating object is reduced
  Area where pressure distribution is disturbed
  Area where pressure distribution is finely moved
  Area surrounding each of the areas described above For example, a database or a model base describing relation between the surface shape and direction for improving pressure and pressure distribution is stored in the storage unit 121. The control unit 102 obtains, by using this database or model base, change quantity of the shape of an oscillating object for improving pressure.

The control unit 102 may preliminarily define the following control quantity that indicates relation between a target excitation force coefficient and behavior of an oscillating object (physical field affecting operation of an object to be controlled), and control the shape of the oscillating object to reduce an error with a target. The control quantity is represented by, for example, a data table, a relational expression, or a mathematical model (for example, coefficients $A_1$ and $A_2$ of a cubic function).
  Relation between a target excitation force coefficient (or pressure distribution of a surface of an oscillating object) and wind velocity
  Relation between a target excitation force coefficient (or pressure distribution of a surface of an oscillating object) and oscillation velocity of the oscillating object
  Relation between a target excitation force coefficient (or pressure distribution of a surface of an oscillating object) and an attack angle Control Example-2

This is an example of a case where sensing can be performed on displacement distribution of a surface of an oscillating object by an image-taking apparatus (an example of sensors).

The arithmetic processing unit 110 (calculation unit 111) converts a history of surface images of an oscillating object acquired by an image-taking apparatus and the like into a history of displacement distribution with a digital image correlation method. The calculation unit 111 calculates, from the obtained displacement distribution, pressure distribution (temporal change in pressure distribution) of the whole surface of the oscillating object using, for example, an estimation model such as the FEMLN.

Moreover, by integrating the calculated pressure distributions over the surface of an oscillating object, the calculation unit 111 calculates a temporal change in excitation force coefficient loaded to the oscillating object and a displacement velocity dependence property. Other processes are the same as those in the foregoing Control Example-1.

Control Example-3

This is an example of a case where sensing can be performed on pressure distribution of the whole surface of an oscillating object by a pressure sensor.

The arithmetic processing unit 110 (calculation unit 111) acquires temporal change in pressure distribution of a surface of an oscillating object on which sensing is performed by a pressure sensor. By integrating the acquired pressure distributions over the surface of the oscillating object, the calculation unit 111 calculates a temporal change in excitation force coefficient loaded to the oscillating object. Other processes are the same as those in the foregoing Control Example-1.

Note that Control Example-3 can be taken as an example of performing control without using the FEMLN. In this manner, when any other method capable of obtaining physical field at a faster pace can be applied, real-time system control using monitoring data and the like can be implemented even without using an estimation model such as the FEMLN.

Control Example-4

This is an example of a case where sensing can be performed on displacement distribution of a part of the surface of an oscillating object by a displacement measuring instrument or an image-taking apparatus (image).

The arithmetic processing unit 110 (calculation unit 111) estimates pressure distribution of a surface of an oscillating object using, for example, the FEMLN. The calculation unit 111 estimates, from pressure distribution including noise of an area on which sensing can be performed and estimated pressure distribution, pressure distribution of a surface of the oscillating object through data assimilation. The calculation unit 111 may modify the FEMLN model to make consistent (such as error minimization) with the displacement distribution on which sensing has been performed. By integrating the obtained pressure distributions over the surface of an oscillating object, the calculation unit 111 calculates a temporal change in excitation force coefficient loaded to the oscillating object. Other processes are the same as those in the foregoing Control Example-1.

Control Example-5

This is an example of a case where there are a plurality of oscillating objects. In addition to the control such as the control in the foregoing Control Examples-1 to 4, the control unit 102 controls the interaction coefficients c between oscillating objects to induce a pulling phenomenon of oscillation phases of the oscillating objects.

The control unit 102 may include the following parameters in control quantity to be controlled.

Elastic parameter k
Viscosity parameter r
Ratio k/m between the elastic parameter k and the mass m of an oscillating object
Ratio r/m between the viscosity parameter r and the mass m of an oscillating object The parameters m, k, and r, which are related to the respective oscillating objects, may be different between part of or all the oscillating objects. In this case, the viscosity parameter also includes mechanical energy loss due to friction and non-elastic deformation and electrical energy loss, such as dumping in a power generation mechanism, a gear, a shaft bearing, and the like.

Control Example-6

Figure 24:
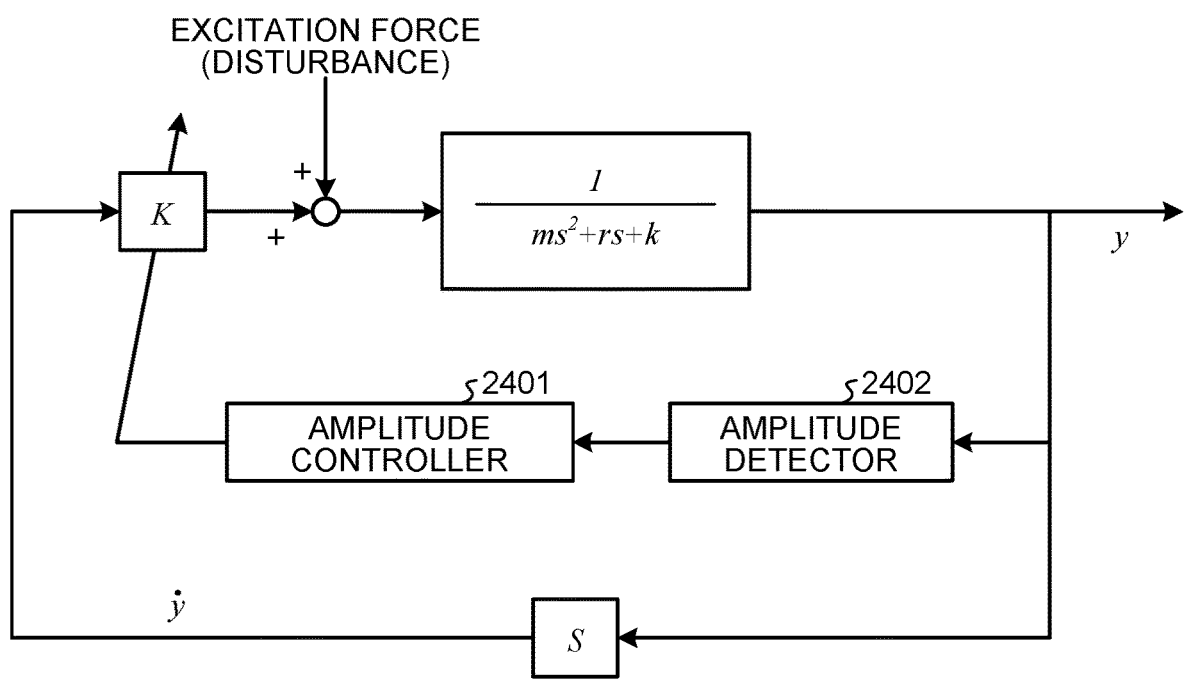
FIG. 24 is a diagram illustrating a structure example of a variable velocity feedback function.

Each of the control examples described above is directed to a method for controlling an excitation force of self-excited oscillation of an oscillating object. In addition to those control methods, variable velocity feedback for providing feedback about a current location and velocity of a self-excited oscillating object may be performed. FIG. 24 is a diagram illustrating a structure example of a function of performing variable velocity feedback.

The control unit 102 performing variable velocity feedback includes, for example, in a system defining disturbance (excitation force) as an oscillation source, an amplitude controller 2401 that changes a velocity feedback gain K and an amplitude detector 2402 depending on a velocity feedback loop for giving a control force proportional to velocity of a self-excited oscillating object and amplitude.

A specific method for implementing variable velocity feedback may be any method, but, for example, the following method can be applied.

Expression (28) represents a motion equation of a self-excited oscillating object when there is no forced external force.

$$m\ddot{y}+(r-K)\dot{y}+ky=0 \qquad (28)$$

As described below, stability of a self-excited oscillating object, in other words, stability of a solution of Expression (28) is determined by positive and negative of a difference between the viscosity parameter r and the velocity feedback gain K.

r−K<0: Self-excited oscillation (Instability)
r−K=0: Persistent oscillation (Stability limit)
r−K>0: Active oscillation control (Stability)

When the velocity feedback gain K is larger than the viscosity parameter r (r−K<0), an oscillating object generates self-excited oscillation. When amplitude is larger, the control unit 102 changes the magnitude of the velocity feedback gain K depending on the magnitude of oscillation, the amplitude is kept constant. When oscillation is small, the control unit 102 may make the velocity feedback gain K larger and generate self-excited oscillation. When oscillation is large, the control unit 102 may make the velocity feedback gain K smaller and perform active oscillation control.

As the amplitude controller 2401 adjusting a value of the velocity feedback gain K, a method for forming three terms of a proportional term of amplitude deviation, a cubic term of the amplitude deviation, and a term in which the amplitude deviation is integrated with respect to a time are used, for example.

Figure 25:
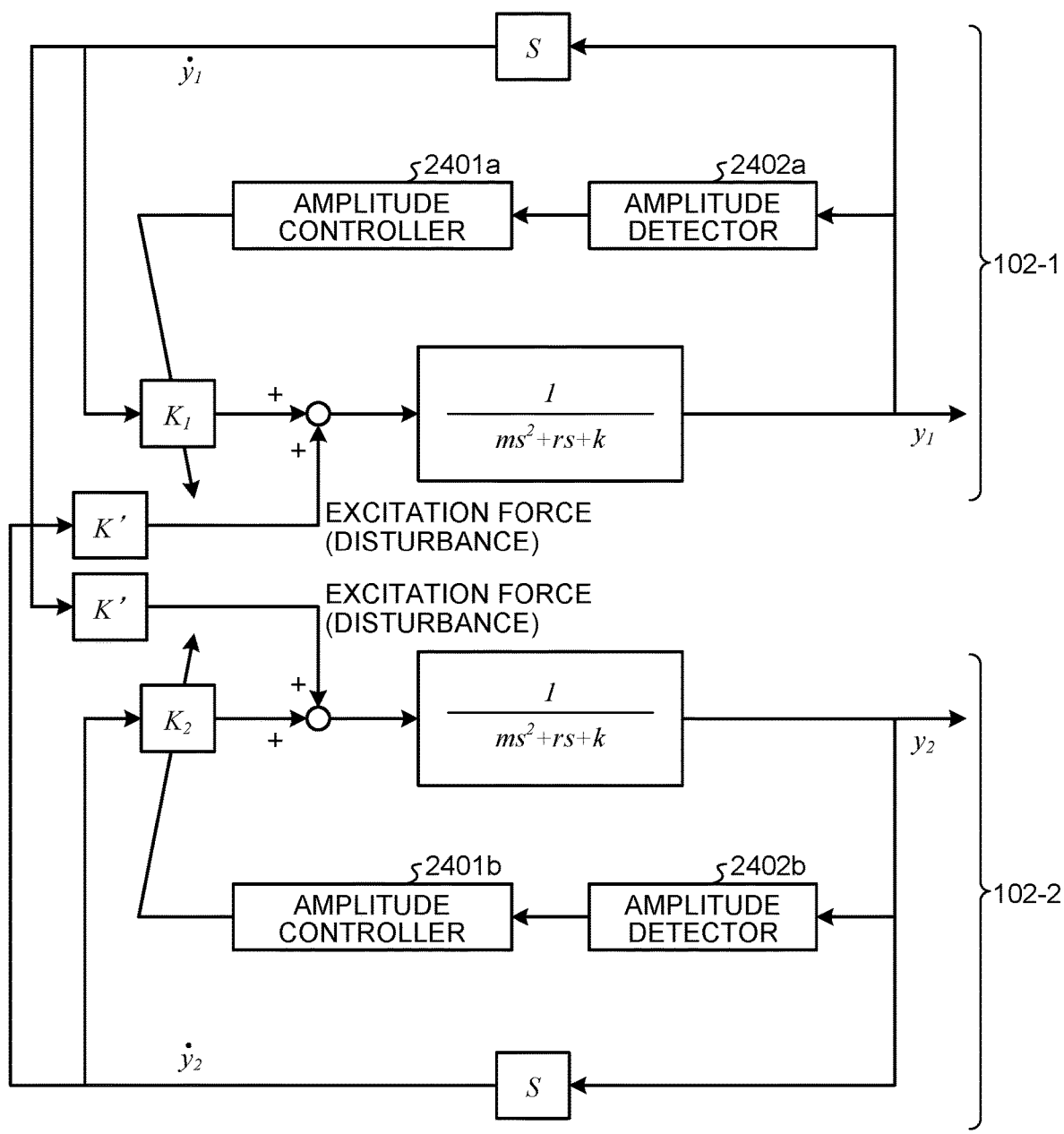
FIG. 25 is a diagram illustrating a structure example of a variable velocity feedback function.
Figure 26:
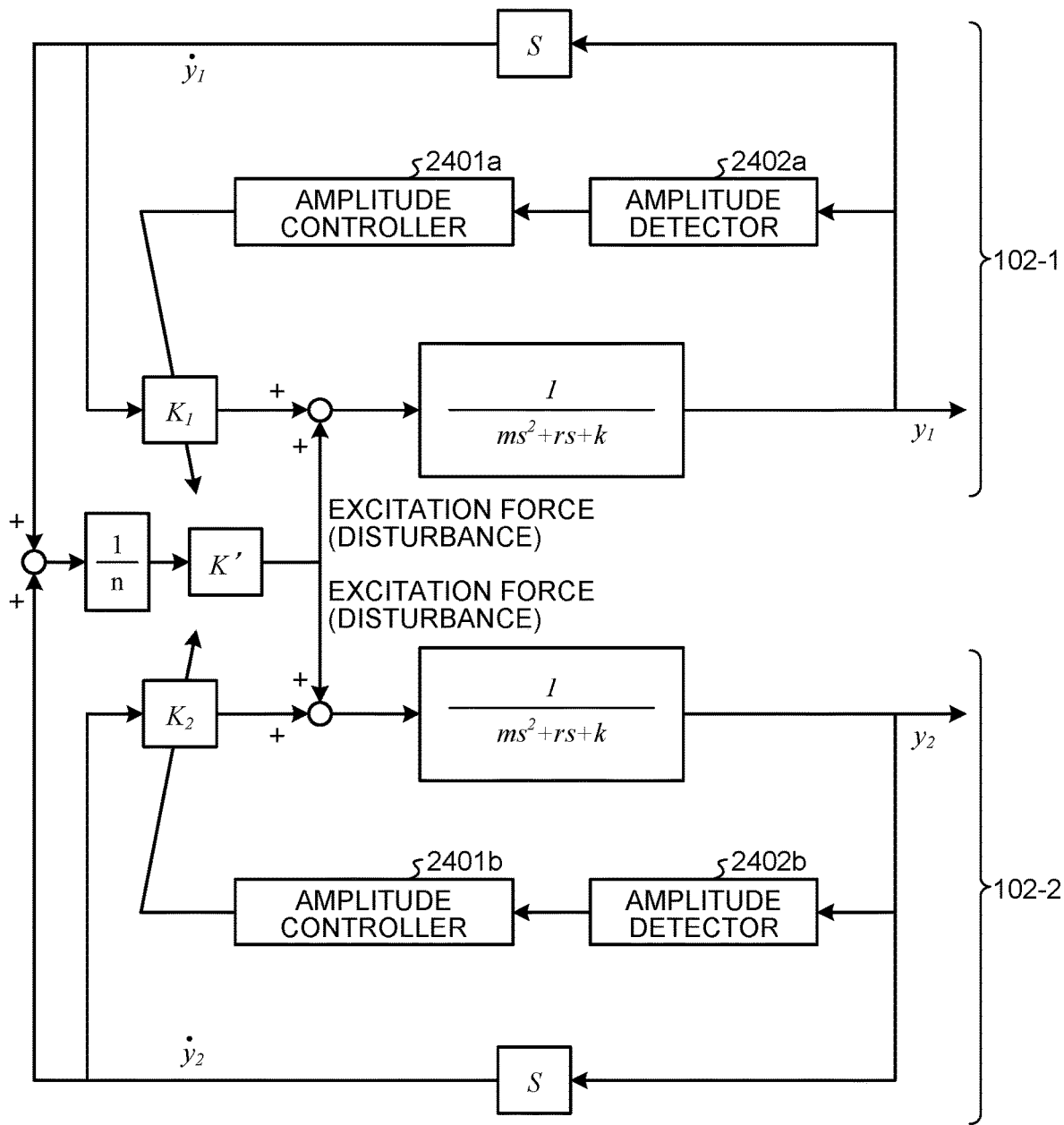
FIG. 26 is a diagram illustrating a structure example of a variable velocity feedback function.

FIGS. 25 and 26 are diagrams illustrating structure examples of variable velocity feedback functions with respect to the structure in which a plurality of self-excited oscillating objects cause inter-pulling. FIG. 25 is the structure example of a variable velocity feedback function with respect to the structure in which a plurality of self-excited oscillating objects interact with each other (FIGS. 18 and 19, for example). FIG. 26 is the structure example of a variable velocity feedback function with respect to the structure (FIG. 20, for example) in which a plurality of self-excited oscillating objects receive interaction from a surrounding field.

Control units 102-1 and 102-2 in FIG. 25 control, for example, among a plurality oscillating objects, the oscillating objects 302-1 and 302-2, respectively. The sign $y_1$ and $K_1$ represent a displacement of the oscillating object 302-1 and a velocity feedback gain with respect to the oscillating object 302-1, respectively. The sign $y_2$ and $K_2$ represent a displacement of the oscillating object 302-2 and a velocity feedback gain with respect to the oscillating object 302-2, respectively. The sign K' (K-dash) represents a velocity feedback gain related to an inter-pulling phenomenon. As described above, the signs m, k, and r may be a different value for each oscillating object.

An amplitude controller 2401a and an amplitude detector 2402a, each being included in the control unit 102-1, have the same functions as in the amplitude controller 2401 and the amplitude detector 2402 in FIG. 24, respectively. An amplitude controller 2401b and an amplitude detector 2402b, each being included in the control unit 102-2, have the same functions as in the amplitude controller 2401 and the amplitude detector 2402 in FIG. 24, respectively.

FIG. 25 illustrates an example of the control units 102-1 and 102-2 with respect to two oscillating objects, but the control unit 102 can be formed with respect to three oscillating objects or more in the same manner.

FIG. 26 illustrating an example of the control units 102-1 and 102-2 with respect to two (n=2) oscillating objects for ease of explanation, but the control unit 102 can be formed with respect to three (n≥3) oscillating objects or more in the same manner.

Each of the control examples described above can be applied to not only the shape control of an oscillating object but also the control of a surface shape and a direction of a blade-like object for increased flow velocity and the like that is included in an airflow control mechanism.

Figure 27:
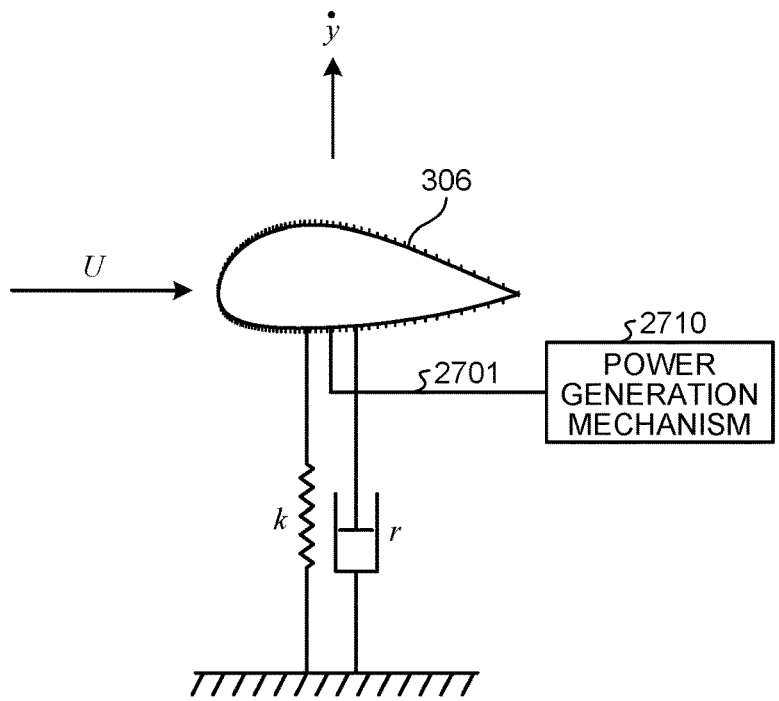
FIG. 27 is a diagram illustrating a structure example of an electromagnetic induction-type oscillation power generation.

The following describes a structure example of a mechanism that generates power based on oscillation of an oscillating object. FIG. 27 is a diagram illustrating a structure example of an electromagnetic induction-type oscillation power generation (rotating power generation). An oscillating object 306 used for oscillation power generation is connected to a power generation mechanism 2710 (a mover 2722 described later) via a connection unit 2701.

Figure 28:
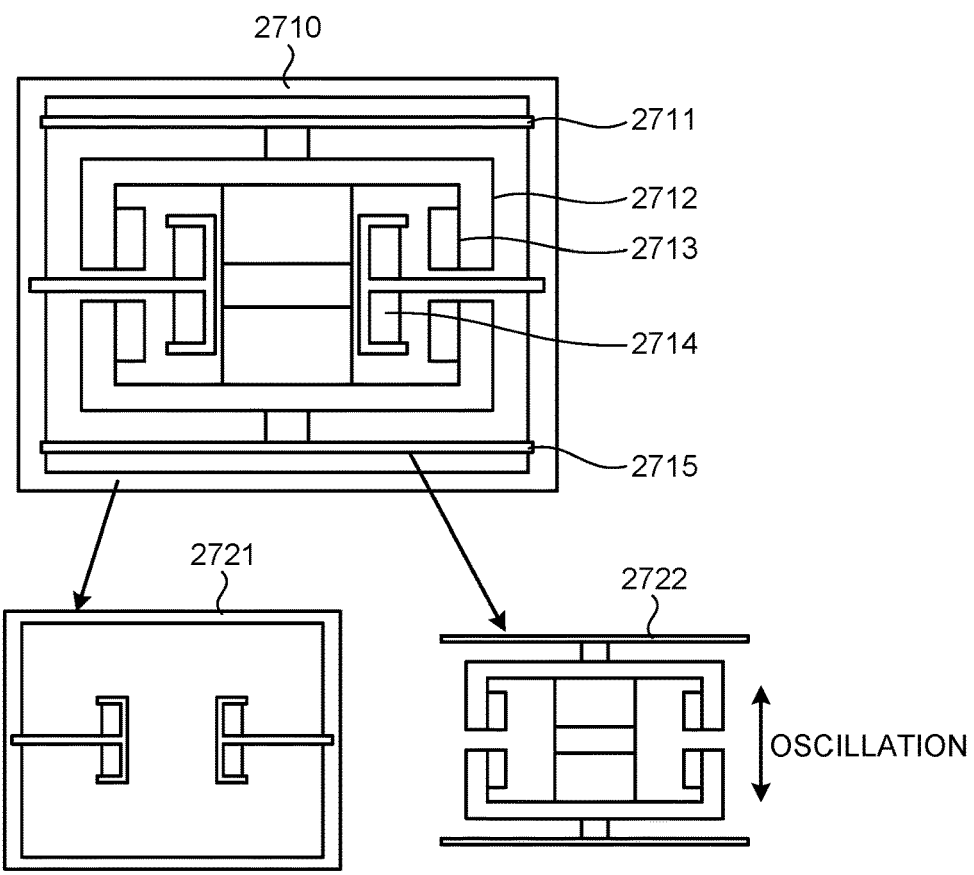
FIG. 28 is a diagram illustrating a structure example of a power generation mechanism.

FIG. 28 is a diagram illustrating a structure example of the power generation mechanism 2710. The power generation mechanism 2710 includes a spring 2711, an iron core 2712, a magnet 2713, a coil 2714, and a spring 2715. The power generation mechanism 2710 can be divided into a stator 2721 and the mover 2722. The stator 2721 includes the coil 2714. The mover 2722 includes the spring 2711, the iron core 2712, the magnet 2713, and the spring 2715. The mover 2722 is connected to the oscillating object 306 via the connection unit 2701, and oscillates depending on oscillation of the oscillating object 306. At this time, the stator 2721 is in a fixed state, and does not oscillate.

In a case that the power generation mechanism 2710 is used, the control unit 102 may control electrically physical field of the power generation mechanism 2710 as control quantity.

In addition, the control unit 102 may control deformation quantity of an oscillating object and a surrounding support unit, a displacement, and acceleration as control quantity.

In this manner, a control apparatus according to the present embodiment can estimate physical field that can be used for controlling an oscillating object used for generating power at a faster pace.

In the present embodiment, focusing on the fact that a flow field surrounding an object is often complicated and it is difficult to estimate temporal and spatial flow velocity distribution, an estimation model capable of performing this kind of estimation is realized. Specifically, a control apparatus of the present embodiment includes a mechanism (structure) that generates or deforms displacement distribution on a surface of an object through a surrounding flow field, a mechanism that measures physical field (a displacement field and a displacement velocity field) related to a displacement, and an estimation model that estimates pressure (temporal distribution and spatial distribution) received by the object from the displacement field and the displacement velocity field. In this manner, a flow field surrounding an object can be estimated from distribution of pressure received by the object, and appropriate airflow control can be performed based on the estimated information.

Figure 29:
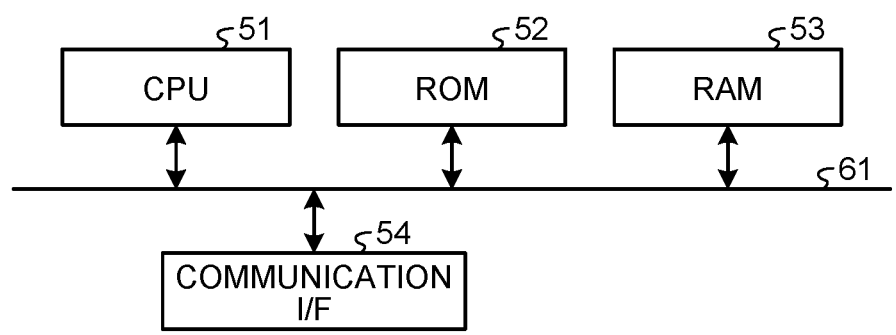
FIG. 29 is the hardware structure diagram of the control apparatus according to the embodiment.

The following describes the hardware configuration of the control apparatus 100 according to the present embodiment with reference to FIG. 29. FIG. 29 is an explanatory diagram illustrating an example of the hardware configuration of the control apparatus according to the present embodiment.

The control apparatus according to the present embodiment includes a control device (or a hardware processor) such as a CPU 51, memory devices such as a read only memory (ROM) 52, a RAM 53, and so on, a communication interface (I/F) 54 connected to a network for communication, and a bus 61 connecting elements of the apparatus to each other.

A computer program executed by a computer as the control apparatus 100 according to the present embodiment is preliminarily incorporated in the ROM 52 and the like so as to be provided.

The computer program executed by the control apparatus according to the present embodiment may be a file in an installable format or in an executable format, and be recorded in a computer-readable recording medium, such as a compact disc read only memory (CD-ROM), a flexible disk (FD), a compact disc recordable (CD-R), or a digital versatile disc (DVD), so as to be provided as a computer program product.

Furthermore, the computer program executed by the control apparatus according to the present embodiment may be stored in a computer connected to a network such as the Internet and be downloaded over the network so as to be provided. The computer program executed by the control apparatus according to the present embodiment may be provided or distributed over a network such as the Internet.

The computer program executed by the control apparatus according to the present embodiment enables a computer (or a hardware processor) to function as each unit of the control apparatus 100 described above. After the CPU 51 reads the computer program on a main storage apparatus from a computer-readable storage medium, this computer can execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control apparatus comprising:
one or more hardware processors configured to
acquire, for each of elements, pieces of input data representing a first physical field of a corresponding one of the elements at a first time point, the elements being obtained by discretization of an analysis area as an object to be controlled wherein
the object to be controlled is an object performing self-excited oscillation or self-excited rotation for generating an excitation force;
calculate, for each of the elements, a second physical field of a corresponding one of the elements at a second time point after the first time point, the second physical field being calculated based on a value of an energy functional representing energy of the corresponding one of the elements, the value of the energy functional being obtained by inputting the pieces of input data into an estimation model; and
control the object to be controlled such that control quantity based on the second physical field becomes a target value.

2. The control apparatus according to claim 1, wherein the one or more hardware processors control the object to be controlled such that the control quantity indicating relation between the excitation force and physical field affecting operation of the object to be controlled becomes the target value.

3. The control apparatus according to claim 2, wherein the target value is defined such that relation between the excitation force and the physical field is relation of inducing the self-excited oscillation or self-excited rotation with stability and robustness.

4. The control apparatus according to claim 3, wherein the target value is expressed by a cubic function in which relation between the excitation force and the physical field is relation of inducing the self-excited oscillation or self-excited rotation with stability and robustness.

5. The control apparatus according to claim 2, wherein the object to be controlled is a plurality of objects performing the self-excited oscillation or the self-excited rotation; and
the target value is defined such that relation between the excitation force and the physical field is relation of inducing
the self-excited oscillation or self-excited rotation with stability and robustness, and
a pulling phenomenon through interaction of the plurality of objects.

6. The control apparatus according to claim 1, wherein the one or more hardware processors are further configured to learn the estimation model to minimize a difference between a gradient of a value of the energy functional and correct answer data of the gradient.

7. The control apparatus according to claim 6, wherein the one or more hardware processors learn the estimation model to minimize a difference between a value of the energy functional and correct answer data of the value of the energy functional.

8. The control apparatus according to claim 1, wherein the estimation model is a neural network model or a hierarchical Bayesian model.

9. The control apparatus according to claim 1, wherein, in response to input of the pieces of input data at the first time point, the estimation model outputs a value of the energy functional at the second time point and the second physical field.

10. The control apparatus according to claim 1, wherein
the energy functional is an energy functional used for analysis of continuum dynamics, and
the energy functional represents, with respect to each of the elements, energy calculated by stored energy, loss energy, and a given workload.

11. The control apparatus according to claim 1, wherein
the energy functional is an energy functional used for electromagnetic field analysis, and
the energy functional represents, with respect to each of the elements, energy calculated by exothermic energy and a workload caused by an inductive current.

12. The control apparatus according to claim 1, wherein
the energy functional is an energy functional used for coupled analysis of a structure and a magnetic field, and
the energy functional represents, with respect to each of the elements, energy calculated by elastic strain energy, kinetic energy, dissipation energy, and a workload caused by an eddy current.

13. The control apparatus according to claim 1, wherein
the energy functional is an energy functional used for analysis of a phase transition phenomenon, and
the energy functional represents, with respect to each of the elements, energy calculated by superconductive energy, energy caused by a magnetic field, and interaction energy.

14. The control apparatus according to claim 1, wherein
the energy functional is an energy functional used for analysis of electron density and hole density, and
the energy functional represents, with respect to each of the elements, energy calculated by a chemical potential, defect energy, elastic strain energy, gradient energy, crystallographic energy, and a workload from external stress.

15. A control method implemented by a computer, the method comprising:
acquiring, for each of elements, pieces of input data representing a first physical field of a corresponding one of the elements at a first time point, the elements being obtained by discretization of an analysis area as an object to be controlled, wherein
the object to be controlled is an object performing self-excited oscillation or self-excited rotation for generating an excitation force;
calculating, for each of the elements, a second physical field of a corresponding one of the elements at a second time point after the first time point, the second physical field being calculated based on a value of an energy functional representing energy of the corresponding one of the elements, the value of the energy functional being obtained by inputting the pieces of input data into an estimation model; and
controlling the object to be controlled such that control quantity based on the second physical field becomes a target value.

16. A computer program product comprising a non-transitory computer-readable recording medium on which an executable program is recorded, the program instructing a computer to:
acquire, for each of elements, pieces of input data representing a first physical field of a corresponding one of the elements at a first time point, the elements being obtained by discretization of an analysis area as an object to be controlled, wherein
the object to be controlled is an object performing self-excited oscillation or self-excited rotation for generating an excitation force;
calculate, for each of the elements, a second physical field of a corresponding one of the elements at a second time point after the first time point, the second physical field being calculated based on a value of an energy functional representing energy of the corresponding one of the elements, the value of the energy functional being obtained by inputting the pieces of input data into an estimation model; and
control the object to be controlled such that control quantity based on the second physical field becomes a target value.

17. A control apparatus comprising:
one or more hardware processors configured to
acquire a first physical field of an element of an object to be controlled at a first time point by discretization of an analysis area of each element of the object to be controlled, the object to be controlled performing self-excited oscillation or self-excited rotation for generating an excitation force;
calculate, based on the first physical field, a second physical field of the element of the object to be controlled at a second time point after the first time point; and
control the object to be controlled such that control quantity based on the second physical field becomes a target value, the control quantity indicating relation between the excitation force and physical field affecting operation of the object to be controlled, the target value being defined to have relation of inducing self-excited oscillation or self-excited rotation with stability and robustness.

* * * * *